United States Patent [19]
Mukaide et al.

[11] Patent Number: 5,835,316
[45] Date of Patent: Nov. 10, 1998

[54] MAGNETIC HEAD AND METHOD OF FABRICATING THE SAME

[75] Inventors: Nariaki Mukaide; Yoshio Takeshima, both of Shiga, Japan

[73] Assignee: NEC Corporation, Japan

[21] Appl. No.: 885,743

[22] Filed: Jun. 30, 1997

[51] Int. Cl.⁶ ................................. G11B 5/31; G11B 5/39
[52] U.S. Cl. ........................................... 360/126; 360/113
[58] Field of Search .................................... 360/113, 121, 360/126, 119

[56] References Cited

U.S. PATENT DOCUMENTS 5,606,478  2/1997  Chen et al. ............................. 360/126

FOREIGN PATENT DOCUMENTS 772927  8/1995  Japan .

*Primary Examiner*—Robert S. Tupper
*Attorney, Agent, or Firm*—Hayes, Soloway, Hennessey, Grossman & Hage, P.C.

[57] ABSTRACT

There is provided a magnetic head including (a) a block made of magnetic substance, and having first and second leg portions defining a recess therebetween, (b) a first magnetic thin film covering at least on an upper surface of the first leg portion therewith, (c) a member made of non-magnetic substance, and formed within the recess so as to connect the first and second leg portions with each other therethrough, the member being formed therein with an opening through which a wiring is introduced, (d) a non-magnetic thin film formed on the first magnetic thin film above the upper surface of the first leg portion, the non-magnetic thin film constituting a magnetic gap, and (e) a second magnetic thin film formed on the non-magnetic thin film, the member and an upper surface of the second leg portion. Since the magnetic head is formed essentially of a unitary block, external forces would not be concentrated on the gap which is weak in strength, with the result that the magnetic head is less likely to be damaged, for example, by cracking. In addition, gap length is dependent only on the thickness of the gap material layer, which ensures high accuracy in gap length. Furthermore, the magnetic head can be fabricated without carrying out a glass bonding step for fixing a pair of core-halves to each other, thus eliminating the possibility of differences in gap depth due to misalignment of the core-halves.

7 Claims, 16 Drawing Sheets

MAGNETIC HEAD AND METHOD OF FABRICATING THE SAME

BACKGROUND OF THE INVENTION

1. Field of the Invention

The invention relates to a magnetic head including a magnetic thin film formed on a ferromagnetic or non-magnetic block, and a magnetic core made of another magnetic thin film and formed on the firstly mentioned magnetic thin film. The invention also relates to a method of fabricating such a magnetic head.

2. Description of the Related Art

A magnetic head has been improved so far in a field of magnetically recording in line with a need of increasing a record density, enhancing performances, and reducing fabrication costs. For instance, there have been suggested: a dimensional approach of shortening a track width and/or a gap length for increasing recording density; a functional approach of employing a high saturation magnetic flux density material for enhancing a coercive force of magnetic medium, or of employing a high magnetic permeability material for enhancing sensitivity; an approach of reducing an impedance for accomplishing a higher operation speed; and an improvement in fabrication process for reducing fabrication costs.

Hereinbelow is explained a conventional bulk-type magnetic head as an example. As a magnetic medium has been improved, it has a higher coercive force. However, since ferromagnetic metal oxide such as ferrite of which a conventional magnetic head is made has such a low saturation magnetic flux density, a portion of a magnetic head made only of ferrite is soon saturated in the vicinity of a magnetic gap, resulting in that it is impossible to record data into a high coercive force medium. Thus, in order to record data into such a high coercive force medium, a magnetic thin film made of alloy of metals having high saturation magnetic flux densities are employed around a magnetic gap. Namely, the above mentioned ferromagnetic metal oxide has been employed in combination with a magnetic thin film made of the above mentioned metal alloy as so-called metal-in-gap (hereinafter, referred to simply as "MIG").

FIG. 1 illustrates one example of conventional magnetic head. A magnetic core-half 321 comprises a magnetic block 310 made of ferrite and formed with a recess 320 for accommodating a winding, and a magnetic thin film 340 made of Sendust and formed on an inner surface of the recess 320. An upper surface of the recess 320 constitutes a gap forming surface 330. Since the magnetic thin film 340 is anisotropic, the magnetic characteristics of the magnetic thin film 340 vary in accordance with a direction in which sputtered material is deposited. Thus, the magnetic thin film 340 has portions having satisfactory characteristics and portions having poor characteristics. A pair of the magnetic core halves 321 is joined to each other with non-magnetic thin films 350 sandwiched therebetween, and fixed to each other through bonding glass 360. Thus, a magnetic head is completed. The non-magnetic thin films 350 form a gap between the magnetic core halves 321.

FIG. 2 illustrates another example of a conventional magnetic head which is designed to operate at a higher speed and have lower impedance. The illustrated magnetic head includes a substrate 420 made of non-magnetic substance such as ceramic, a lower magnetic core 450 formed by the magnetic layers deposited on the substrate 420, non-magnetic layers 470 such as $SiO_2$ layers formed on a distal end of the lower magnetic core 450, the non-magnetic layers constituting a magnetic gap 470, a magnetic pole 490 disposed at the rear of the lower magnetic core 450, a pair of terminals 480, an electrically conductive spiral coil 440 formed on the substrate 420 and surrounding the magnetic pole 490, ends of the spiral coil 440 being connected to the terminals 480, and an upper magnetic core 460 extending over the spiral coil 440, the magnetic pole 490 and the magnetic gap 470.

Spaces formed between arcuate lines of the spiral coil 440 are filled with non-magnetic insulating material to thereby flatten a surface of the coil 440 and eliminate irregularity between the arcuate lines of the spiral coil 440, avoidable for a magnetic thin film formed on the coil 440 to have deteriorated performance. Thus, the spiral coil 440 has to have a flattened surface. The upper magnetic core 460 makes magnetic connection with the lower magnetic core 450 through the magnetic pole 490 to thereby form a closed magnetic circuit. Thus, the upper and lower magnetic cores 460 and 450 cooperate with each other to constitute a magnetic head. Since the upper and lower magnetic cores 460 and 450 are fabricated in a plating step, they are made of permalloy which is plateable.

With respect to the MIG head illustrated in FIG. 1, a magnetic thin film made of ferromagnetic metal oxide such as ferrite has a coefficient of thermal expansion quite different from that of a magnetic thin film made of metal alloy. Hence, when the core-halves comprising ferrite and a magnetic thin film formed on the ferrite are glass-bonded to each other, the adhesion strength of the magnetic thin film to the ferrite may be unpreferably weakened due to lowering and raising of glass-bonding temperature. In addition, the magnetic thin film would receive a stress due to a difference in a coefficient of thermal expansion, and thus the magnetic characteristics of the magnetic thin film might be deteriorated.

In order to avoid these problems, there was employed a glass having a low melting point ensuring that glass-bonding is carried out at a lower temperature. However, a glass having a low melting point has a shortcoming that it is of low relative strength. Thus, if a conventional magnetic head formed of a pair of the core-halves 321 connected to each other through a low melting point glass to an external glass, there exists a possibility that the connected core-halves may split between the bonding-glass and the ferrite or between the magnetic thin film and the ferrite.

As mentioned above, the MIG head is formed of the magnetic core halves which are comprised of a block made of ferromagnetic metal oxide such as ferrite and a magnetic thin film deposited on the block. Hence, the magnetic head formed by connecting a pair of the core-halves has significant volume of ferromagnetic metal oxide, resulting in an impedance which is too high for a magnetic head capable of operating at a high speed.

In addition, connecting a pair of the core-halves into a unitary magnetic head often deteriorates the performances of the magnetic head and often reduces a fabrication yield, because a pair of the core-halves may be connected to each other in misaligned condition, a pair of the core-halves may be connected to each other with a dust interposed therebetween with the result of dispersion in a gap length, and a gap depth of the completed magnetic heads is often in dispersion because of less accuracy in the dimensions of the recesses 320.

The magnetic head illustrated in FIG. 2 has a problem as follows. The magnetic head requires thin film formation steps such as plating, evaporation and sputtering steps and a lot of photolithography steps for the formation of the thin film. The requirement for several fabrication steps reduces fabrication yield. As mentioned earlier, irregularity in spaces formed between lines of the spiral coil formed by means of photolithography has to be eliminated, because such irregularity would deteriorate the performances of a magnetic thin film (namely, the upper magnetic core 460 in FIG. 2) formed thereon. However, several steps are required to be carried out in order to eliminate the irregularity.

Heat-resistant resin such as polyimide resin has been conventionally employed in order to fill the spaces formed between lines of the spiral coil. However, when the temperature is raised, even heat-resistant resin would be deformed or evapotranspired. Hence, it was impossible to anneal a magnetic thin film formed on the coil for enhancing a magnetic permeability thereof.

As mentioned earlier, the magnetic core of the magnetic head is made of permalloy, because the magnetic core is fabricated in a plating step. However, permalloy has smaller saturation magnetic flux density and magnetic permeability than other metal materials used for forming a magnetic thin film, and hence can have an over-write characteristic in the range of −25 dB to −26 dB, resulting in a problem that the performances of the magnetic head is deteriorated due to residual noises. In addition, complex, expensive equipment is required for carrying out film formation steps and photo-lithography steps, resulting in an increase in fabrication costs of the magnetic head.

As mentioned above, the conventional MIG head and the magnetic thin film head have a lot of problems, and cannot meet the requirements of increasing a recording density, enhancing performances and reducing fabrication costs.

Japanese Unexamined Patent Publication No. 62-145510 (Japanese Patent Publication No. 7-72927) published on Jun. 29, 1987 (now abandoned) has suggested a magnetic head comprising a pair of core-halves each including a magnetic core made of ferromagnetic oxide, and a ferro-magnetic metal thin film covering the magnetic core therewith, the ferromagnetic metal thin films being bonded to each other to thereby constitute a magnetic gap therebetween. The magnetic head has a reaction preventing film made of oxide and metal disposed between ferromagnetic oxide and a ferromagnetic metal thin film in the vicinity of a magnetic gap, and the oxide is disposed at the side of the magnetic core, and the metal is disposed at the side of the ferromagnetic metal thin film.

However, such prior art magnetic head also cannot meet the requirements of increasing a recording density, enhancing performances and reducing fabrication costs.

SUMMARY OF THE INVENTION

In view of the foregoing problems of the conventional magnetic heads, it is an object of the present invention to provide a magnetic head which is unlikely to be split because of an external force, and capable of having a gap length with high accuracy, eliminating dispersion in a gap depth, and decreasing the number of fabrication steps, and which has superior head characteristics such as data reproduction characteristic and over-write characteristic.

In one aspect, there is provided a magnetic head including (a) a block made of magnetic substance, and having first and second leg portions defining a recess therebetween, (b) a first magnetic thin film covering at least on an upper surface of the first leg portion therewith, (c) a member made of non-magnetic substance, and formed within the recess so as to connect the first and second leg portions with each other therethrough, the member being formed therein with an opening through which a wiring is introduced, (d) a non-magnetic thin film formed on the first magnetic thin film above the upper surface of the first leg portion, the non-magnetic thin film constituting a magnetic gap, and (e) a second magnetic thin film formed on the non-magnetic thin film, the member and an upper surface of the second leg portion.

It is preferable that the first magnetic thin film covers an inner surface of the recess as well as the upper surface of the first leg portion. It is preferable that the first and/or magnetic thin film are(is).made of FeTaN alloy.

There is further provided a magnetic head including an almost a substantially rectangular, hollow magnetic core having a side surface along which the magnetic head makes engagement with a magnetic medium, a portion of the magnetic core defining the side surface being made of magnetic ferrite and at least a part of other portions of the magnetic core being made of a magnetic thin film.

There is still further provided a magnetic head including (a) a first portion made of magnetic ferrite and defining a surface along which the magnetic head makes engagement with a magnetic medium, (b) a second portion made of ferrite and spaced away in parallel from the first portion, (c) first and second non-magnetic members connecting the first and second portions with each other therethrough to thereby define a substantially rectangular, hollow magnetic core, (d) a first non-magnetic thin film formed on the second member above the first portion, the first non-magnetic thin film constituting a magnetic gap, (e) a second non-magnetic thin film formed over the first non-magnetic thin film, the second member and an end surface of the second portion, and (1) a third non-magnetic thin film formed on an end surface of the first portion, the first member and the other end surface of the second portion.

Protection films may be further formed on the second and third non-magnetic thin films.

There is yet further provided a magnetic head including (a) a block made of glass, and having first and second leg portions defining a recess therebetween, (b) a first magnetic thin film covering at least on an upper surface of the first leg portion therewith, (c) a member made of non-magnetic substance, and formed within the recess so as to connect the first and second leg portions with each other therethrough, the member being formed therein with an opening through which a wiring is introduced, (d) a non-magnetic thin film formed on the first magnetic thin film above the upper surface of the first leg portion, the non-magnetic thin film constituting a magnetic gap, and (e) a second magnetic thin film formed on the non-magnetic thin film, the member and an upper surface of the second leg portion.

There is still further provided a magnetic head including (a) a block made of magnetic substance, and having first and second leg portions defining a recess therebetween, (b) a first magnetic thin film covering at least on an upper surface of the first leg portion therewith, (c) a member made of non-magnetic substance, and formed within the recess so as to connect the first and second leg portions with each other therethrough, the member being formed therein with an opening through which a wiring is introduced, (d) a non-magnetic thin film formed on the first magnetic thin film above the upper surface of the first leg portion, the non-magnetic thin film constituting a magnetic gap, and (e) a second magnetic thin film formed on the non-magnetic thin film, the member and an upper surface of the second leg portion, the second magnetic thin film extending at deep end of the magnetic gap so that angles of apexes are increased.

It is preferable that the member is formed arcuate projecting outwardly of the opening.

There is still further provided a magnetic head including (a) a block made of glass, and having first and second leg portions defining a recess therebetween, (b) a first magnetic thin film covering at least on an upper surface of the first leg portion therewith, (c) a member made of non-magnetic substance, and formed within the recess so as to connect the first and second leg portions with each other therethrough, the member being formed therein with an opening through which a wiring is introduced, (d) a non-magnetic thin film formed on the first magnetic thin film above the upper surface of the first leg portion, the non-magnetic thin film constituting a magnetic gap, and (e) a second magnetic thin film formed on the non-magnetic thin film, the member and an upper surface of the second leg portion, the second magnetic thin film extending at deep end of the magnetic gap so that angles of apexes are increased.

There is further provided a vertical magnetic head including (a) a block made of magnetic substance, and having first and second leg portions defining a recess therebetween, (b) a member made of non-magnetic substance, and connecting the first and second leg portions with each other therethrough, the first and second leg portions and the member defining an opening therebetween through which a wiring is introduced, and (c) a main pole formed of magnetic thin films on the member, the first leg portion constituting a return path core for the main pole.

There is yet further provided a compound magnetic head including a vertical magnetic head and a magneto-resistance effect magnetic head, in which the vertical magnetic head includes (a) a block made of magnetic substance, and having first and second leg portions defining a recess therebetween, (b) a member made of non-magnetic substance, and connecting the first and second leg portions with each other therethrough, the first and second leg portions and the member defining an opening therebetween through which a wiring is introduced, and (c) a main pole formed of a magnetic thin film on the member, the first leg portion constituting a return path core for the main pole, and the magneto-resistance effect magnetic head is formed on the main pole with an insulating film sandwiched therebetween.

It is preferable that at least one of the magnetic thin films is made of FeTaN alloy. There may be formed a protection layer on the magneto-resistance effect magnetic head for protecting the same.

There is further provided a compound magnetic head including a first magnetic head for recording data and a second magnetic head for reproducing data, in which the first magnetic head includes (a) a block made of magnetic substance, and having first and second leg portions defining a recess therebetween, (b) a first magnetic thin film covering at least on an upper surface of the first leg portion therewith, (c) a member made of non-magnetic substance, and formed within the recess so as to connect the first and second leg portions with each other therethrough, the member being formed therein with an opening through which a wiring is introduced, (d) a non-magnetic thin film formed on the first magnetic thin film above the upper surface of the first leg portion, the non-magnetic thin film constituting a magnetic gap, and (e) a second magnetic thin film formed on the non-magnetic thin film, the member and an upper surface of the second leg portion, and the second magnetic head includes (a) a first non-magnetic insulating thin film formed on the second magnetic thin film, (b) a magneto-resistance effect device formed on the first non-magnetic insulating film above the first leg portion, (c) a lead making electrical connection with the magneto-resistance effect device, (d) a second non-magnetic insulating thin film covering the magneto-resistance effect device and the lead therewith, and (e) a third magnetic thin film formed on the second non-magnetic insulating thin film.

The second magnetic head may further include a protection layer formed on the third magnetic thin film for protecting the same. It is preferable that at least one of the first, second and third magnetic thin films is made of FeTaN alloy.

In another aspect, there is provided a method of fabricating a magnetic head, including the steps of (a) preparing a block made of magnetic substance and having first and second leg portions defining a recess therebetween, and forming a first magnetic thin film at least on an upper surface of the first leg portion, (b) connecting the first and second leg portions with each other through a member made of non-magnetic substance so that there exists an opening within the recess, (c) forming a non-magnetic thin film on the upper surface of the first leg portion, the non-magnetic thin film constituting a magnetic gap, and (d) forming a second magnetic thin film over the non-magnetic thin film, the member and the second leg portion.

The above mentioned method may further include the step (e) of chamfering the first and second leg portions at their inner edges. The step (e) is to be carried out prior to forming the first magnetic thin film.

The opening may be formed in various ways. For instance, the opening may be formed by the steps of (f) inserting a rod into the recess, (g) filling the recess with filler and hardening the filler, and (h) drawing the rod out. In this case, it is preferable that the rod is made of carbon, and the filler is glass.

The member in the step (b) may be formed in various ways. For instance, the member may be formed by the steps of (i) filling the recess with molten material with the opening existing in the recess, (j) hardening the material, and (k) grinding the material until upper surfaces of the first and second leg portions appear. Alternately, the member may be formed by the steps of (l) covering the recess with a block made of non-magnetic material, (m) fixing the block to the first and second leg portions, and (n) grinding the block until the first and second leg portions appear. It is preferable that the block is made of glass having a low melting point.

There is further provided a method of fabricating a magnetic head, including the steps of (a) preparing a block made of magnetic substance and having first and second leg portions defining a recess therebetween, and forming a first magnetic thin film at least on an upper surface of the first leg portion, (b) turning the block upside down and placing the block on a base with a meltable material being put on the base within the recess, (c) heating the meltable material to thereby melt the material on the base whereupon, the thus molten material spreads on the base and connects the first and second leg portions with each other therethrough, (d) forming a non-magnetic thin film on the upper surface of the first leg portion, the non-magnetic thin film constituting a magnetic gap, and (e) forming a second magnetic thin film over the non-magnetic thin film, the member and the second leg portion.

It is preferable that the base has the same coefficient of thermal expansion of that of the block. It also is preferable that the meltable material is glass in the form of a rod, or is heat-resistant resin made of silicon and having a low viscosity.

The meltable material may have the volume by which there is formed an opening within the recess when the meltable material is molten to thereby connect the first and second leg portions with each other. For instance, the block may be made of glass.

There is still further provided a method of fabricating a magnetic head, including the steps of (a) preparing a block made of magnetic substance and having first and second leg portions defining a recess therebetween, (b) putting a meltable material on a bottom surface of the recess, and heating the meltable material to thereby melt the material on the bottom surface of the recess, (c) turning the block upside down and placing the block on a base with a meltable material being put on the base within the recess, (d) heating the meltable material to thereby melt the material on the base, whereupon molten material spreads on the base and connects the first and second leg portions with each other therethrough, (e) forming a non-magnetic thin film on the upper surface of the first leg portion, the non-magnetic thin film constituting a magnetic gap, and (f) forming a second magnetic thin film over the non-magnetic thin film, the member and the second leg portion.

The above mentioned method may further include the step (h) of grinding distal ends of the first and second leg portions to a predetermined dimension, the step (h) being to be carried out prior to the step (c). The method may further include the step (i) of grinding the block at a bottom and the base to a predetermined dimension, the step (i) being to be carried out between the steps (d) and (e).

There is yet further provided a method of fabricating a magnetic head, including the steps of (a) forming a magnetic thin film on a glass substrate, (b) heating the glass substrate to thereby soften the glass, (c) pressing a block having a raised portion onto the thus softened glass substrate to thereby form first and second leg portions in the glass substrate, the first and second leg portions defining a recess therebetween, (d) connecting the first and second leg portions with each other through a member made of non-magnetic substance so that there exists an opening within the recess, (e) forming a non-magnetic thin film on the upper surface of the first leg portion, the non-magnetic thin film constituting a magnetic gap, and (f) forming a second magnetic thin film over the non-magnetic thin film, the member and the second leg portion.

It is preferable that the glass substrate is formed with a plurality of trenches at which the glass substrate can be divided into a plurality of sections, and wherein the block has a plurality of raised portions accordingly. The magnetic thin film in the step (a) may be made of FeTaN alloy. It is preferable that the raised portion of the block has rounded corners.

The member in the step (d) may be formed in various ways. For instance, the member may be formed by the steps of (g) covering the recess with a layer made of meltable material, such as glass, and formed on a substrate, (h) heating and thereby half-melting the meltable material to connect the first and second leg portions with each other, and (i) removing the substrate.

There is still yet further provided a method of fabricating a magnetic head, including the steps of (a) preparing a block made of magnetic substance and having first and second leg portions defining a recess therebetween, and forming a first magnetic thin film at least on an upper surface of the first leg portion, (b) connecting the first and second leg portions with each other through a member made of non-magnetic substance so that there exists an opening within the recess, (c) turning the block upside down and heating the member to make the member bend downwardly in an arcuate shape, (d) forming a non-magnetic thin film on the upper surface of the first leg portion, the non-magnetic thin film constituting a magnetic gap, and (e) forming a second magnetic thin film over the non-magnetic thin film, the member and the second leg portion.

The member may be formed by the steps of (f) turning the block upside down and placing the block on a base with a piece of glass being put on the base within the recess, (g) heating the glass to thereby melt the glass on the base, the thus molten glass resultingly spreading on the base and thus connecting the first and second leg portions with each other therethrough, and (h) cooling and thereby hardening the molten glass.

The advantages obtained by the aforementioned present invention will be described hereinbelow.

In accordance with the present invention, a magnetic head has a core-half comprising a magnetic block and a magnetic thin film sputtered on the magnetic block without heating. Another magnetic thin film is formed on an end surface of the core-half with a gap member sandwiched therebetween to thereby constitute a magnetic circuit. Thus, the magnetic head is formed essentially of a unitary block, with the result that external forces will not be concentrated on the gap portion which is weak in strength, thus preventing the magnetic head from being or broken or split.

Secondly, when a pair of the core-halves is bonded to each other, no dust is interposed therebetween. Thus, a gap length is dependent only on a thickness of a sputtered layer made of sputtering material, ensuring high accuracy in a gap length.

Thirdly, the magnetic head in accordance with the present invention can be fabricated without carrying out a glass-bonding step for bonding a pair of the core-halves. Hence, a dispersion in a gap depth which would be caused by misalignment of the a pair of core-halves when bonded is avoided, which in turn reduces the number of fabrication steps and hence reduce fabrication costs.

Fourthly, it is no longer necessary to prepare a high temperature condition for melting a glass. Though conventional magnetic heads have a problem that a magnetic thin film would experience a stress due to a difference in a coefficient of thermal expansion between a magnetic block and the magnetic thin film made of metal alloy with the result of deterioration of the performances of the magnetic head, such is avoided by the magnetic head in accordance with the invention which eliminates the need for a high temperature glass-bonding step. In addition, since the magnetic thin film is not exposed to a high temperature, no crystal alteration results, and hence the performances of the magnetic head are not deteriorated.

Fifthly, if a magnetic thin film is made of FeTaN alloy, the film can have greater magnetic permeability and saturation magnetic flux density than those of Sendust and permalloy, resulting in superior head characteristics such as data reproduction characteristic and over-write characteristic.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
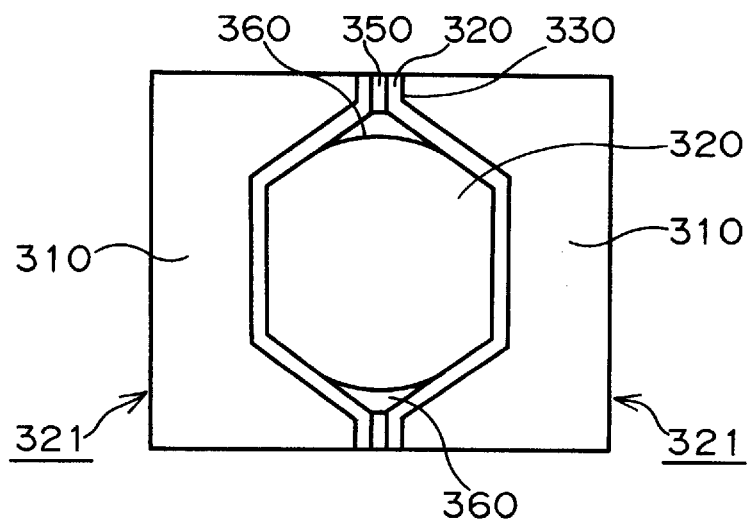
FIG. 1 is a cross-sectional view illustrating a conventional bulk-type magnetic head.
Figure 2:
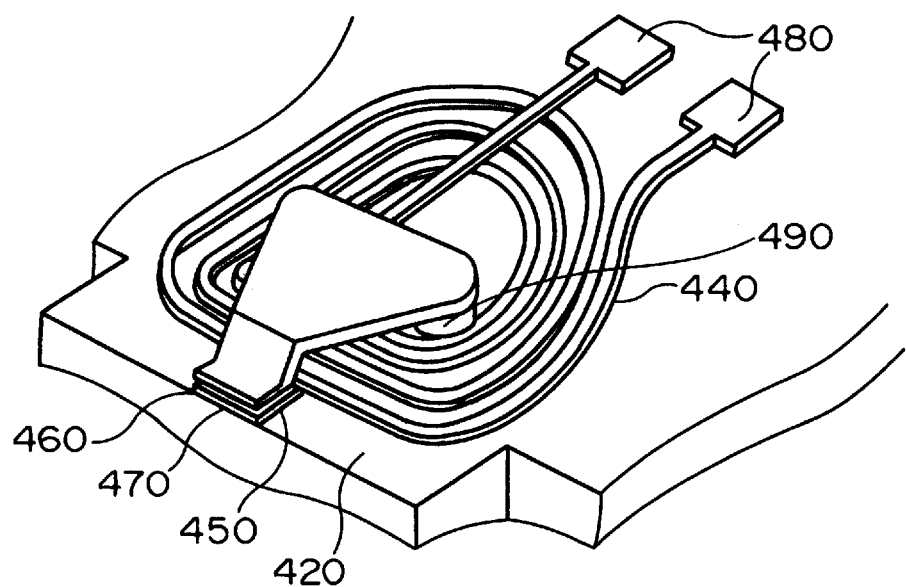
FIG. 2 is a perspective view illustrating a conventional thin film type magnetic head.
Figure 3:
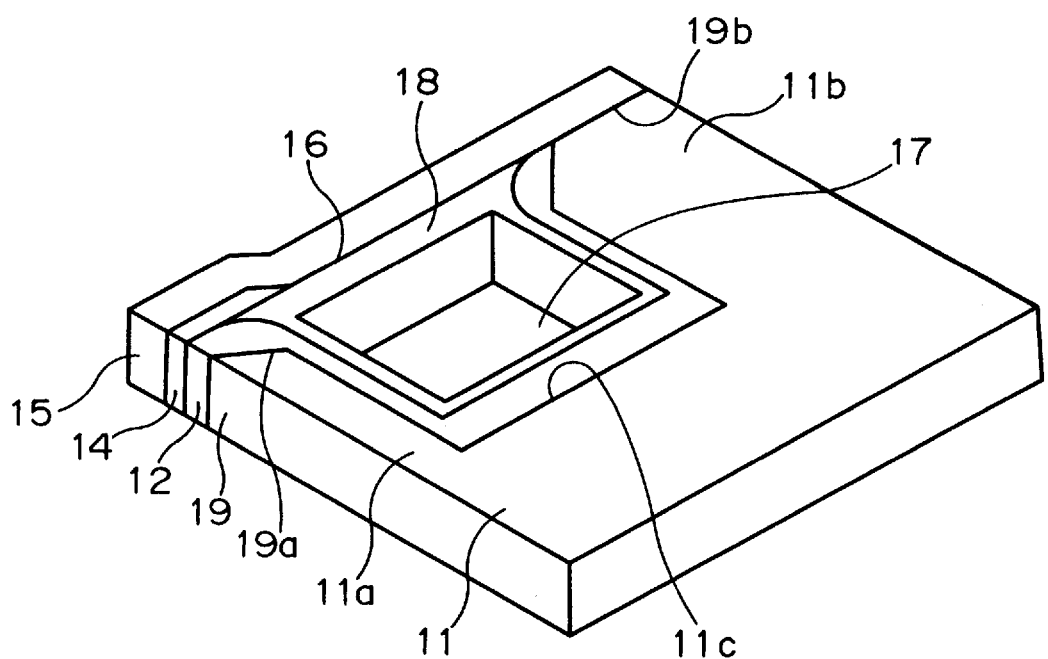
FIG. 3 is a perspective view illustrating a magnetic head in accordance with the first embodiment of the present invention.

FIG. 3 illustrates a magnetic head in accordance with the present invention. The illustrated magnetic head includes a block 11 made of magnetic substance such as ferrite, and having first and second leg portions 11a and 11b defining a recess 11c therebetween. The first and second leg portions 11a and 11b are chamfered at their inner edges. A first magnetic thin film 12 is formed on an inner surface of the recess 11c by vacuum thin film formation such as sputtering. The first magnetic thin film 12 is made of FeTaN alloy, and has a thickness in the range of 1 $\mu$m to 10 $\mu$m. A member 18 is formed covering inner surfaces of the first magnetic thin film 12 formed in the recess 11c so that there exists a rectangular window 17 in the member 18. A winding is introduced into the window 17. The member 18 may be formed of any non-magnetic substance. In the first embodiment, the member 18 is made of glass having a melting point in the range of 300° C. to 550° C. both inclusive.

The first and second leg portions 11a and 11b, the first magnetic thin film 12 and the member 18 have a flat, continuous upper surface 16 constituting a gap forming plane. A non-magnetic thin film 14 is formed on the gap forming plane 16 above the first leg portion 11a. The non-magnetic thin film 14 entirely covers the first magnetic thin film 12 and extends slightly onto the glass 18. The non-magnetic thin film 14 is made of $SiO_2$, constituting a magnetic gap, and is designed to have a thickness equal to a magnetic gap length. A second magnetic thin film 15 made of FeTaN alloy is formed covering the non-magnetic thin film 14, the member 18, the first magnetic thin film 12 and the second leg portion 11b. Thus, the illustrated magnetic head has a substantially rectangular magnetic circuit.

It should be noted that the first magnetic thin film 12 may cover at least on an upper surface 19b of the first leg portion 11a of the magnetic block 11. Since the magnetic circuit in the first embodiment is formed of the block having the first and second leg portions 11a and 11b, the first magnetic thin film 12 formed on the inner surface of the recess 11c, the glass member 18 connecting the first and second leg portions 11a and 11b, the non-magnetic gap forming member 14, and the second magnetic thin film 15, it is not necessary to the pair of core-halves comprising a magnetic block and a magnetic thin film bonded to the block, to bond them to each other, as in the fabrication of a conventional magnetic head. Hence, neither deterioration in bonding strength of a magnetic thin film nor crystal alteration in a magnetic film occurs. In addition, since it is not necessary to carry out a glass-bonding step, a gap length is dependent only on a thickness of the non-magnetic thin film 14, resulting in enhancement of accuracy in a gap length. Furthermore, a dispersion in a gap depth caused by misalignment of the core-halves is eliminated because the magnetic head in accordance with the present invention does not employ core-halves.

FIGS. 4A to 4G illustrate respective steps of a method of fabricating the magnetic head illustrated in FIG. 3.

Figure 4A:
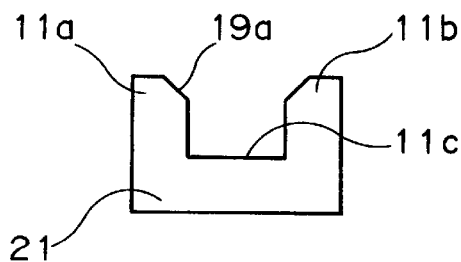
FIGS. 4A to 4G are cross-sectional views of the magnetic head illustrated in FIG. 3, showing respective steps of a method of fabricating the magnetic head.
Figure 4E:
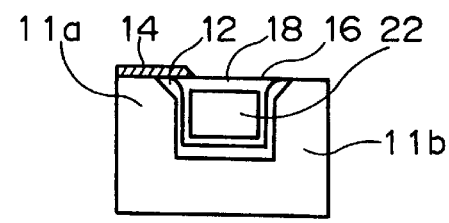
Figure 4B:
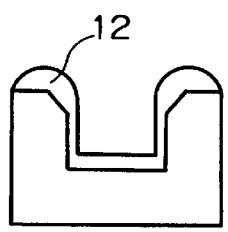

First, as illustrated in FIG. 4A, there is prepared a block 21 made of magnetic substance such as ferrite, and having first and second leg portions 11a and 11b defining a recess 11c therebetween. The block 21 is chamfered with a grinding stone at inner edges of the first and second leg portions 11a and 11b. Then, as illustrated in FIG. 4B, a first magnetic thin film 12 is sputtered on an inner surface of the recess 11c and the end surfaces of the first and second leg portions 11a and 11b. The first magnetic thin film 12 is made of FeTaN alloy.

Figure 4F:
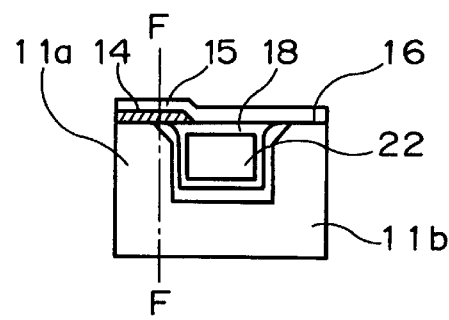
Figure 4C:
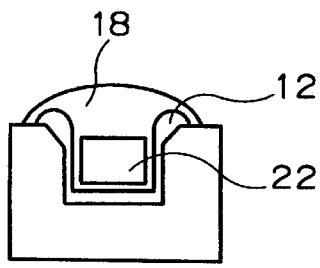

Then, as illustrated in FIG. 4C, a carbon rod 22 having a cross-section corresponding to a later mentioned window 17 for a winding passing therethrough is supported in floating condition in the recess 11c. Then, a glass 18 having a low melting point is melted in a fusion furnace, and the thus molten glass 18 is introduced into the recess 11c, surrounding the carbon rod 22 therewith. Then, the molten glass 18 is cooled down to thereby harden. The hardened glass 18 acts as a member for connecting the first and second leg portions 11a and 11b to each other therethrough.

Figure 4G:
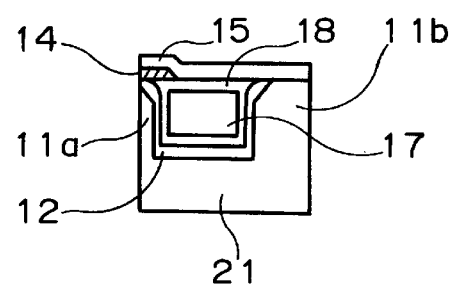
Figure 4D:
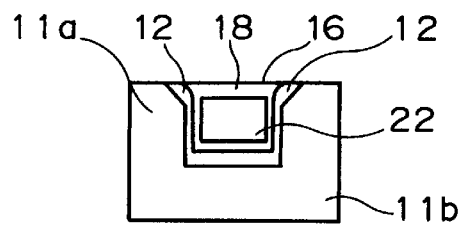

Then, as illustrated in FIG. 4D, the product of FIG. 4C is ground with a surface grinder until a magnetic gap forming plane 16 appears. At this stage, the first and second leg portions 11a and 11b, the first magnetic thin film 12 and the hardened glass 18 are exposed. Then, as illustrated in FIG. 4E, a non-magnetic thin film 14 made of $SiO_2$ is formed on the magnetic gap forming plane 16 over the end surface of the first leg portion 11a, the first magnetic thin film 12, and a part of the glass 18. The non-magnetic thin film 14 is designed to have a predetermined thickness.

Then, as illustrated in FIG. 4F, a second magnetic thin film 15 made of FeTaN alloy is formed by sputtering over the magnetic gap forming plane 16, namely over the non-magnetic thin film 14, the glass 18, the first magnetic thin film 12, and the second leg portion 11b. Then, the block 21 is ground with a surface grinder from a left side to a dashed line F-F, and the block 21 is sliced into pieces with a dicer in a direction perpendicular to a length-wise direction of the block 21, namely, in a direction in parallel with a plane of the drawing. Each of the pieces of the block 21 has a predetermined track width.

Then, the carbon rod 22 is drawn out of the glass 18 to leave a window 17 for a winding passing therethrough. Thus, as illustrated in FIG. 4G, there is completed a magnetic head in accordance with the first embodiment. An advantage of employing carbon rod 22 is that it can be readily drawn out of the glass 18, because carbon has a small adhesive force with glass. Other materials may be employed in place of carbon, if they have a small adhesive force with a material of which the member 18 is made.

FIGS. 5A to 5G illustrate respective steps of another method of fabricating the magnetic head illustrated in FIG. 3.

Figure 5A:
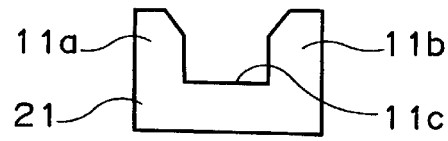
FIGS. 5A to 5G are cross-sectional views of the magnetic head illustrated in FIG. 3, showing respective steps of another method of fabricating the magnetic head.
Figure 5B:
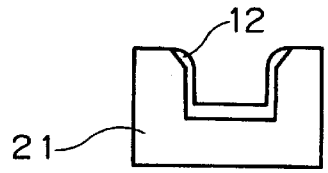

First, as illustrated in FIG. 5A, there is prepared a block 21 made of magnetic substance such as ferrite, and having first and second leg portions 11a and 11b defining a recess 11c therebetween. The block 21 is chamfered with a grinding stone at inner edges of the first and second leg portions 11a and 11b. Then, as illustrated in FIG. 5B, a first magnetic thin film 12 made of FeTaN alloy is formed by sputtering on an inner surface of the recess.

Figure 5C:
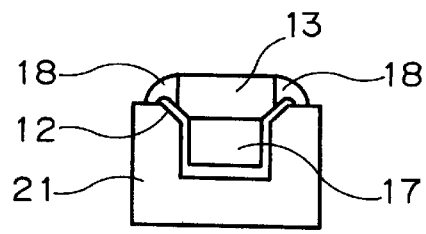

Then, as illustrated in FIG. 5C, the recess 11c is covered with a block 13 made of non-magnetic material such as glass and ceramics in such a way that the block 13 bridges between the first and second leg portions 11a and 11b. The non-magnetic block 13 is fixed to the block 21 by means of an adhesive material such as a glass 18 having a low melting point. At this stage, a window 17 for a winding passing therethrough is formed between the blocks 21 and 13.

Figure 5D:
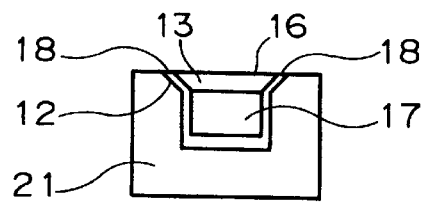

Then, as illustrated in FIG. 5D, the block 13 is ground together with the glass 18 until the first and second leg portions 11a and 11b appear, to thereby form a magnetic gap forming plane 16.

Figure 5E:
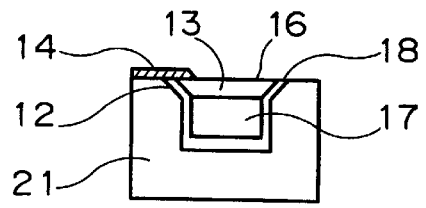

Then, as illustrated in FIG. 5E, a non-magnetic thin film 14 made of $SiO_2$ and having a certain thickness is formed on the magnetic gap forming plane 16 over the end surface of the first leg portion 11a, the first magnetic thin film 12, and a part of the block 13.

Figure 5F:
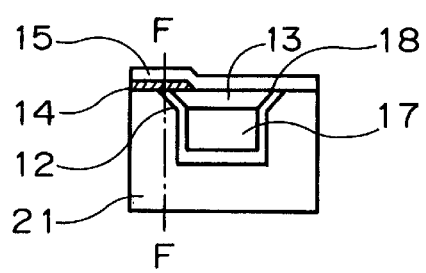

Then, as illustrated in FIG. 5F, a second magnetic thin film 15 made of FeTaN alloy is formed by sputtering over the non-magnetic thin film 14 and the magnetic gap forming plane 16. Then, the block 21 is ground with a surface grinder from a left side to a dashed line F-F, and the block 21 is sliced into pieces with a dicer in a direction perpendicular to a length-wise direction of the block 21. Each of the pieces of the block 21 has a predetermined track width.

Figure 5G:
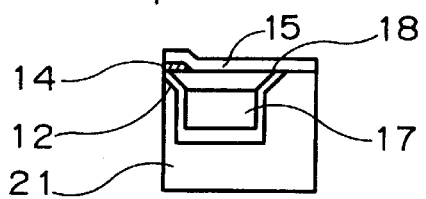

Thus, as illustrated in FIG. 5G, there is completed a magnetic head in accordance with the first embodiment.

FIGS. 6A to 6I illustrate respective steps of still another method of fabricating the magnetic head illustrated in FIG. 3.

Figure 6A:
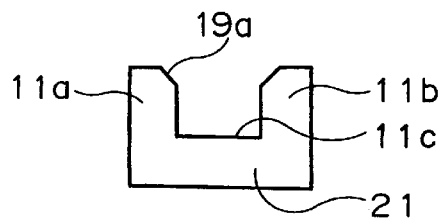
FIGS. 6A to 6I are cross-sectional views of the magnetic head illustrated in FIG. 3, showing respective steps of still another method of fabricating the magnetic head.

First, as illustrated in FIG. 6A, there is prepared a block 21 made of magnetic substance such as ferrite, and having first and second leg portions 11a and 11b defining a recess 11c therebetween. The block 21 is chamfered with a grinding stone at end surfaces of the first and second leg portions 11a and 11b. Then, as illustrated in FIG. 6B, a first magnetic thin film 12 is sputtered on an inner surface of the recess 11c and end surfaces of the first and second leg portions 11a and 11b. The first magnetic thin film 12 is made of FeTaN alloy.

Figure 6F:
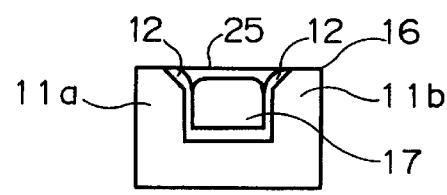
Figure 6B:
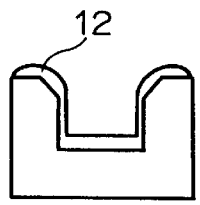
Figure 6G:
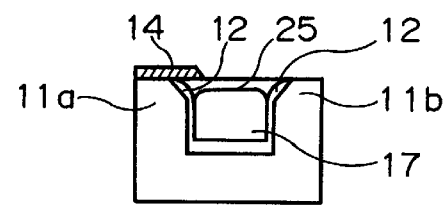
Figure 6C:
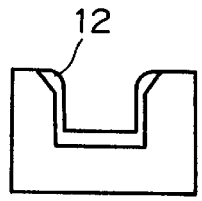

Then, the first magnetic thin film 12 is ground with a surface grinder until the end surfaces of the first and second leg portions 11a and 11b appear, as illustrated in FIG. 6C.

Figure 6H:
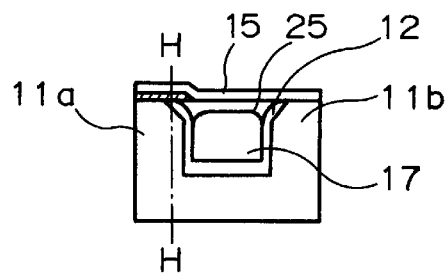
Figure 6D:
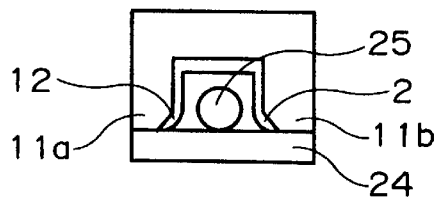

Then, as illustrated in FIG. 6D, the block 21 is turned upside down, and placed on a base 24 made of material having the same coefficient of thermal expansion of that of the block 21. The block 21 is temporarily fixed onto the base 24 by means of inorganic adhesive (not illustrated). Then, a rod 25 made of glass having a low melting point is inserted into the recess 11c on the base 24. The glass rod 25 has a volume by which there is formed a window 17 in the recess 11c when the glass rod 25 is molten and thus spread on the base 24 to thereby close the recess 11c.

Figure 6I:
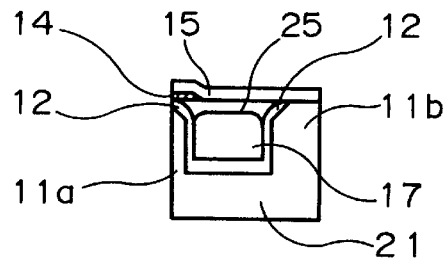
Figure 6E:
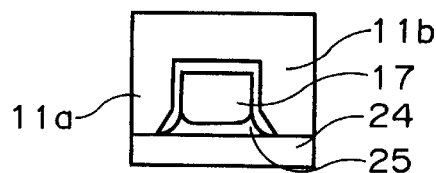

Then, as illustrated in FIG. 6E, the glass rod 25 is heated to thereby melt the glass rod 25. The thus molten glass 25 spreads on the base 24. Then, the glass 25 is cooled down to thereby connect the first and second leg portions 11a and 11b with each other therethrough.

Then, as illustrated in FIG. 6F, the block 21 is turned upside up, and the base 24 is removed, for instance, by grinding with a grinder until the glass 25 appears. Then, the glass 25 is mirror-polished to thereby constitute a magnetic gap forming plane 16.

Then, as illustrated in FIG. 6G, a non-magnetic thin film 14 made of $SiO_2$ is formed on the magnetic gap forming plane 16 over the end surface of the first leg portion 11a, the first magnetic thin film 12, and a part of the glass 25.

Then, as illustrated in FIG. 6H, a second magnetic thin film 15 made of FeTaN alloy is formed by sputtering over the magnetic gap forming plane 16 including the non-magnetic thin film 14. Then, the block 21 is ground with a surface grinder from a left side to a dashed line H-H, and the block 21 is sliced into pieces with a dicer in a direction perpendicular to a length-wise direction of the block 21. Each of the pieces of the block 21 has a predetermined track width. Thus, as illustrated in FIG. 6I, there is completed a magnetic head in accordance with the first embodiment.

The reason why the base 24 is chosen to have the same coefficient of thermal expansion as that of the block 21 is to avoid cracking the block 21 due to a stress caused by raising and lowering temperature and the performances of the block 21 are deteriorated, even if the block 21 is not so heated because of the low melting point of the glass 25.

In place of the glass 25, there may be employed silicon family heat-resistant resin which has a low viscosity at room temperature, such as polysilazane, for connecting the first and second leg portions 11a and 11b. If such resin is employed, it is not necessary to heat the block 21 up to a high temperature, and to make the base 24 of a material having the same coefficient of thermal expansion as that of the block 21. In addition, the use of such resin ensures that the block 21 is not thermally deteriorated.

In accordance with the above mentioned embodiment, a magnetic head is comprised of a single core-half and a magnetic thin film covering the core-half therewith, and hence, one magnetic block occupies almost volume of a magnetic head. Thus, a gap forming section which is relatively weak in strength would scarcely receive an external force, which ensures that the magnetic head is not damaged or broken.

The material, FeTaN alloy, of which the first and second magnetic thin films 12 and 15 are made has high saturation magnetic flux density and high magnetic permeability. Thus, the magnetic head having the films 12 and 15 made of FeTaN alloy has superior performances relative to a magnetic head made of Sendust and permalloy. In addition, in accordance with the methods as explained with reference to FIGS. 4 to 6, it is possible to fabricate magnetic heads having high accuracy in gap length and gap depth and also having superior performances with a higher fabrication yield, all ensuring reduction in fabrication costs.

Figure 7:
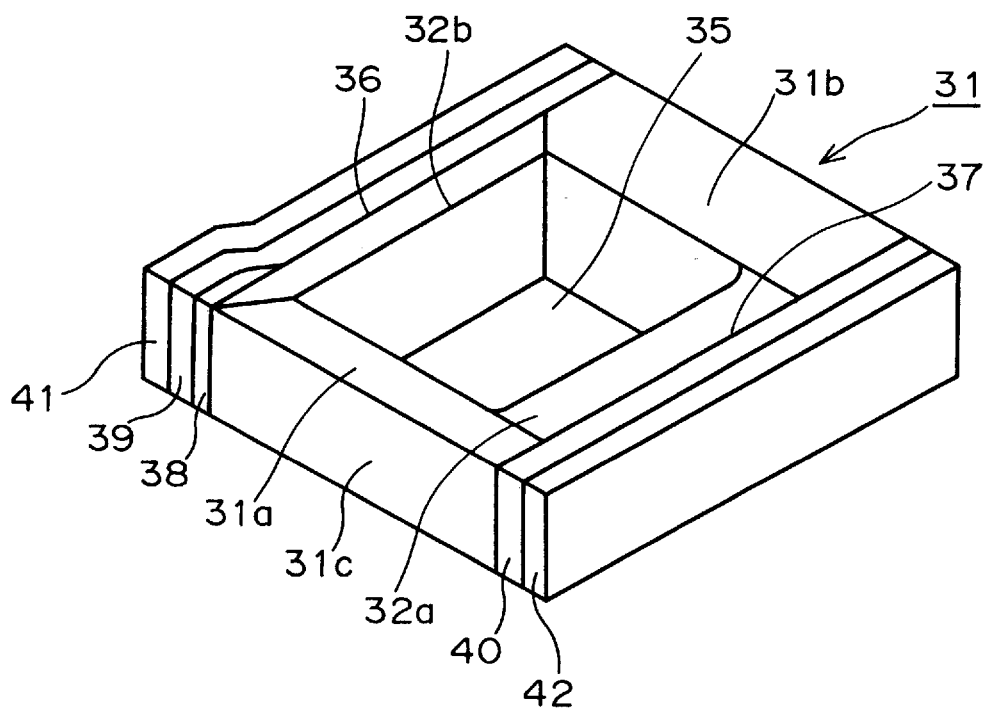
FIG. 7 is a perspective view illustrating a magnetic head in accordance with the second embodiment of the present invention.

In order to reduce an impedance of a magnetic head, it is necessary to reduce size of the magnetic block constituting the magnetic circuit in volume. However, if a magnetic block is merely down-sized, a magnetic circuit has a larger magnetic resistance, which would deteriorate sensitivity in reproduction and recording. A magnetic head in accordance with the second embodiment of the present invention, as illustrated in FIG. 7 can solve the above mentioned problem.

The illustrated magnetic head includes a first portion 31a made of magnetic ferrite and defining a surface 31c along which the magnetic head makes engagement with a magnetic medium, a second portion 31b made of ferrite and spaced apart in parallel from the first portion, first and second non-magnetic members 32a and 32b connecting the first and second portions 31a and 31b with each other therethrough to thereby define a substantially rectangular, hollow magnetic core, a first non-magnetic thin film 38 formed on the second member 32b above the first portion 31a, a second non-magnetic thin film 39 formed over the first non-magnetic thin film 38 and the second member 32b and an end surface of the second portion 31b, a third non-magnetic thin film 40 formed on an end surface of the first portion 31a, the first member 32a and the other end surface of the second portion 31b, and protection films formed on the second and third non-magnetic thin films 39 and 40 for protecting the magnetic head from being damaged.

The first member 32a is made of a glass having a high melting point in the range of 500° C. to 700° C., or amorphous made by thermally treating ceramics precursor polymer. The second member 32b is made of a glass having a low melting point in the range of 300° C. to 500° C., or amorphous made by thermally treating ceramics precursor polymer. The substantially rectangular, hollow magnetic core has a rectangular window 35 for a wiring passing therethrough.

The first portion 31a and the second member 32b cooperate with one another to thereby form a magnetic gap forming plane 36, on which the first non-magnetic thin film 38 is formed. The first non-magnetic thin film 38 is made of $SiO_2$ and constitutes a magnetic gap. The first magnetic thin film 39 covering the first non-magnetic thin film 38 is made of FeTaN alloy or Sendust, and is formed by sputtering to have a thickness in the range of 1 to 10 $\mu$m both inclusive. Thus, the first magnetic thin film 39 forms a magnetic core perpendicular to the surface 31c along which the magnetic head makes engagement with a recording medium.

The first portion 31a, the first member 32a and the second portion 31b cooperates with one another to thereby form a junction plane 37, on which the second magnetic thin film 40 made of FeTaN alloy or Sendust is formed by sputtering to have a thickness in the range of 1 to 10 $\mu$m both inclusive. Similarly to the first magnetic thin film 39, the second magnetic thin film 40 forms a magnetic core perpendicular to the surface 31c. Thus, the first and second portions 31a and 31b and the first and second member 32a and 23b cooperate with one another to form a magnetic circuit for the magnetic head.

Since the surface 31c at which the magnetic head makes slide engagement with a recording medium is made of magnetic ferrite, the magnetic head is ensured to have wear and abrasion resistance. In addition, since the magnetic cores perpendicular to the surface 31c are made of magnetic thin films, the magnetic head has a decreased impedance. Furthermore, the first and second magnetic thin films 39 and 40 both having high magnetic permeability and high saturation magnetic flux density ensures that the magnetic head has a smaller magnetic resistance, and hence provides a greater output.

In the above mentioned first embodiment, pieces of magnetic ferrite constituting a part of a magnetic circuit are joined through members made of non-magnetic material, a thin film is sputtered over the magnetic ferrite pieces and the non-magnetic members, and a thin film is deposited on the magnetic ferrite pieces. Hence, it is possible to accomplish coupling between magnetic ferrite and magnetic thin films over a wide area, which prevents or minimizes increase in magnetic resistance caused by the coupling.

FIGS. 8A to 8K illustrate respective steps of a method of fabricating a magnetic head illustrated in FIG. 7.

Figure 8A:
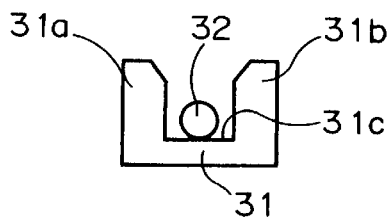
FIGS. 8A to 8K are cross-sectional views of the magnetic head illustrated in FIG. 7, showing respective steps of a method of fabricating the magnetic head.

First, as illustrated in FIG. 8A, there is prepared a block 31 made of magnetic substance and having first and second leg portions 31a and 31b defining a recess 31c therebetween. The block 31 is chamfered with a grinding stone at inner edges of the first and second leg portions 31a and 31b. Then, a glass rod 32 is placed on the bottom of the recess 31c.

Figure 8B:
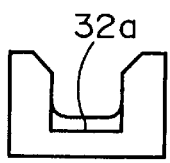

Then, as illustrated in FIG. 8B, the block 31 together with the glass rod 32 is heated in a furnace to thereby melt the glass rod 32. The thus molten glass 32a spreads over the bottom of the recess 31c. Then, the molten glass 32a is cooled down to thereby harden.

Figure 8C:
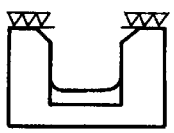

Then, the first and second leg portions 31a and 31b are ground at their end surfaces by a certain length, as illustrated in FIG. 8C.

Figure 8D:
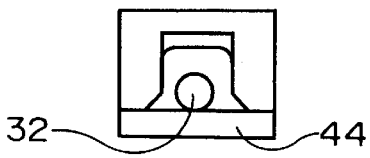

Then, as illustrated in FIG. 8D, the block 32 is turned upside down, and placed on a base 44 made of material having the same coefficient of thermal expansion of that of the block 32. The block 32 is temporarily fixed onto the base 44 by means of inorganic adhesive (not illustrated). Then, a rod 32 made of glass having a low melting point is inserted into the recess 31c on the base 44. The glass rod 32 has a volume by which there is formed a window 35 (see FIG. 8E) in the recess 31c when the glass rod 32 is molten and thus spread on the base 44 to thereby close the recess 31c.

Figure 8E:
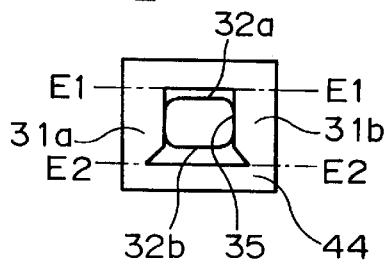

Then, as illustrated in FIG. 8E, the block 31 together with the glass rod 32 is heated to thereby melt the glass rod 32. The thus molten glass 32b spreads on the base 44. Then, the glass 32b is cooled down to thereby connect the first and second leg portions 31a and 31b with each other therethrough.

Figure 8F:
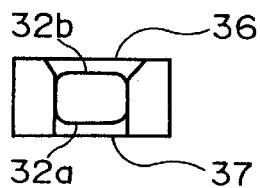

Then, as illustrated in FIG. 8F, the block 31 is turned upside up. Then, the block 31 is ground with a surface grinder from an upper end to the dashed line E1—E1 until the glass 32a appears, and similarly the base 44 is ground from a lower end to the dashed line E2—E2 until the glass 32b appears. Then, exposed surfaces of the glasses 32a and 32b are polished into a mirror surface, thus forming a magnetic gap forming plane 36 and a junction plane 37.

Figure 8G:
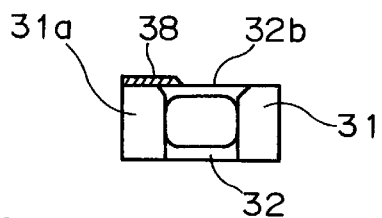

Then, as illustrated in FIG. 8G, a thin film 38 made of non-magnetic material such as $SiO_2$ is formed on the magnetic gap forming plane 36 over the end surface of the first leg portion 31a and a part of the glass 32b.

Figure 8H:
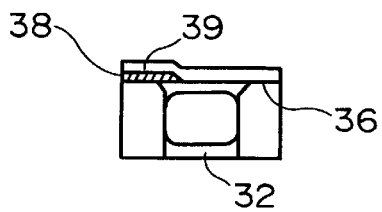

Then, as illustrated in FIG. 8H, a second magnetic thin film 39 made of FeTaN alloy is formed by sputtering over the magnetic gap forming plane 36 including the non-magnetic thin film 38.

Figure 8I:
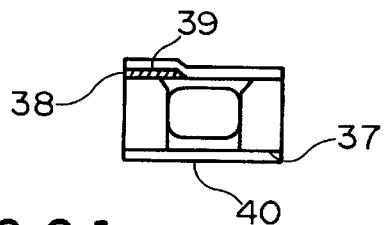

Then, as illustrated in FIG. 8I, a second magnetic thin film 40 made of FeTaN alloy is formed on the junction plane 37.

Figure 8J:
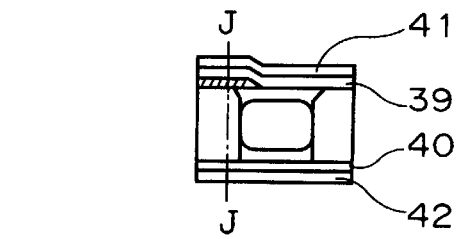

Then, as illustrated in FIG. 8J, protection layers 41 and 42 are formed on the first and second magnetic thin films 39 and 40, respectively.

Figure 8K:
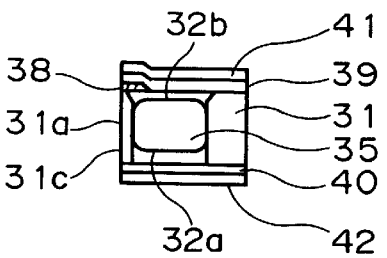

Then, as illustrated in FIG. 8K, the block 31 is ground with a surface grinder from a left side to the dashed line J—J to thereby constitute a surface 31c along which the magnetic head makes slide engagement with a recording medium. The block 31 is sliced into pieces with a dicer in a direction perpendicular to a length-wise direction of the block 31. Each of the pieces of the block 31 has a predetermined track width. Thus, as illustrated in FIG. 8K, there is completed a magnetic head in accordance with the second embodiment.

FIGS. 9A to 9J illustrate respective steps of a method of fabricating a magnetic head illustrated in FIG. 7.

Figure 9A:
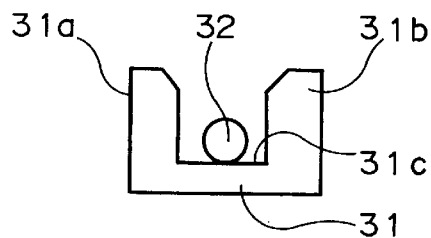
FIGS. 9A to 9J are cross-sectional views of the magnetic head illustrated in FIG. 7, showing respective steps of another method of fabricating the magnetic head.

First, as illustrated in FIG. 9A, there is prepared a block 31 made of magnetic substance and having first and second leg portions 31a and 31b defining a recess 31c therebetween. The block 31 is chamfered with a grinding stone at inner edges of the first and second leg portions 31a and 31b. Then, a glass rod 32 is placed on the bottom of the recess 31c.

Figure 9F:
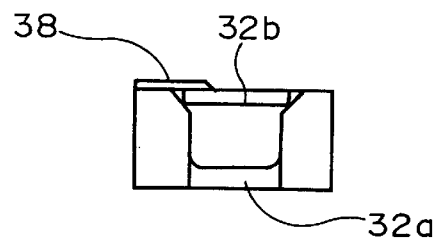
Figure 9B:
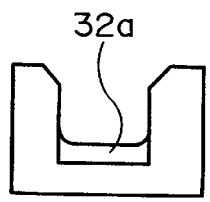

Then, as illustrated in FIG. 9B, the block 31 together with the glass rod 32 is heated to thereby melt the glass rod 32. The thus molten glass 32a spreads over the bottom of the recess 31c. Then, the molten glass 32a is cooled down to thereby harden.

Figure 9G:
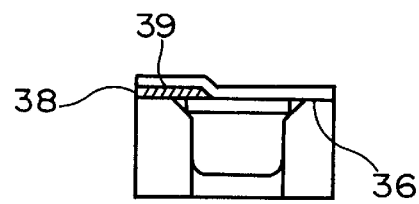
Figure 9C:
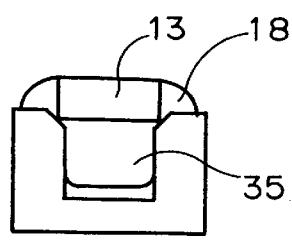

Then, as illustrated in FIG. 9C, the recess 31c is covered with a block 13 made of non-magnetic material such as glass and ceramics in such a way that the block 13 bridges between the first and second leg portions 31a and 31b. The non-magnetic block 13 is fixed to the block 31 by means of an adhesive material such as a glass 18 having a low melting point. A window 35 for a winding passing therethrough is formed between the blocks 31 and 13.

Figure 9H:
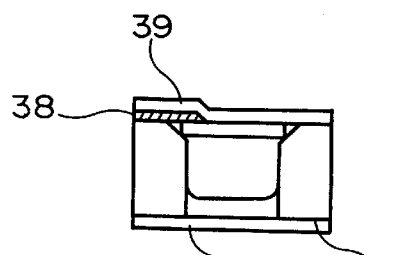
Figure 9D:
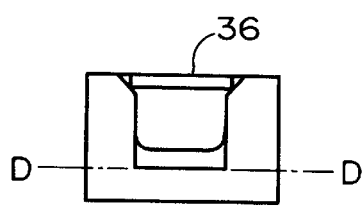

Then, as illustrated in FIG. 9D, the block 13 is ground together with the glass 18 until the first and second leg portions 31a and 31b appear, to thereby form a magnetic gap forming plane 36.

Figure 9I:
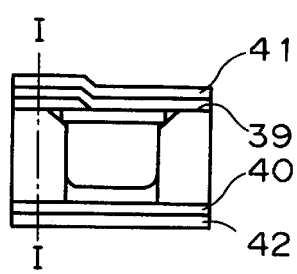
Figure 9E:
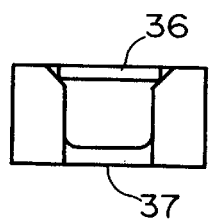

Then, as illustrated in FIG. 9E, the block 31 is ground with a surface grinder from a lower end to the dashed line D—D until the glass 32a appears. Then, exposed surfaces of the glasses 32a and 32b are polished into a mirror surface, thus forming a magnetic gap forming plane 36 and a junction plane 37.

Then, as illustrated in FIG. 9F, a thin film 38 made of non-magnetic material such as $SiO_2$ is formed on the magnetic gap forming plane 36 over the end surface of the first leg portion 31a and a part of the glass 32b.

Then, as illustrated in FIG. 9G, a second magnetic thin film 39 made of FeTaN alloy is formed by sputtering over the magnetic gap forming plane 36 including the non-magnetic thin film 38.

Then, as illustrated in FIG. 9H, a second magnetic thin film 40 made of FeTaN alloy is formed on the junction plane 37.

Then, as illustrated in FIG. 9I, protection layers 41 and 42 are formed on the first and second magnetic thin films 39 and 40, respectively.

Figure 9J:
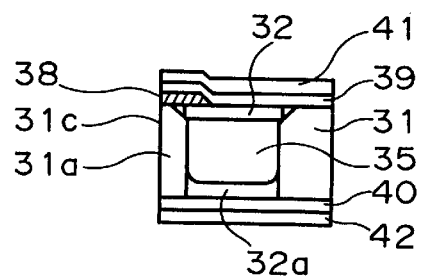

Then, as illustrated in FIG. 9J, the block 31 is ground with a surface grinder from a left side to the dashed line I—I to thereby constitute a surface 31c along which the magnetic head makes slide engagement with a recording medium. The block 31 is sliced into pieces with a dicer in a direction perpendicular to a length-wise direction of the block 31. Each of the pieces of the block 31 has a predetermined track width. Thus, as illustrated in FIG. 9J, there is completed a magnetic head in accordance with the second embodiment.

An almost rectangular block having the window 35 therein, as one illustrated in FIG. 9D, may be formed in various ways. In the above mentioned second embodiment, such a rectangular block is formed by adding the non-magnetic member 32b (FIG. 8E) or the non-magnetic block 13 (FIG. 9D) to the magnetic ferrite block 31 (FIGS. 8A and 9A). As an alternative, the block 31 may be made of non-magnetic material, and blocks made of magnetic ferrite may be joined to side surfaces of the block 31. Alternately, blocks made of magnetic ferrite may be joined to side surfaces of a rectangular, hollow block made of non-magnetic material. Bars made of magnetic ferrite and bars made of glass may be assembled into a rectangular block, and joined to each other by heating up to a point close to a melting point of glass, and compressing them to each other to thereby thermally join them to each other.

Figure 10:
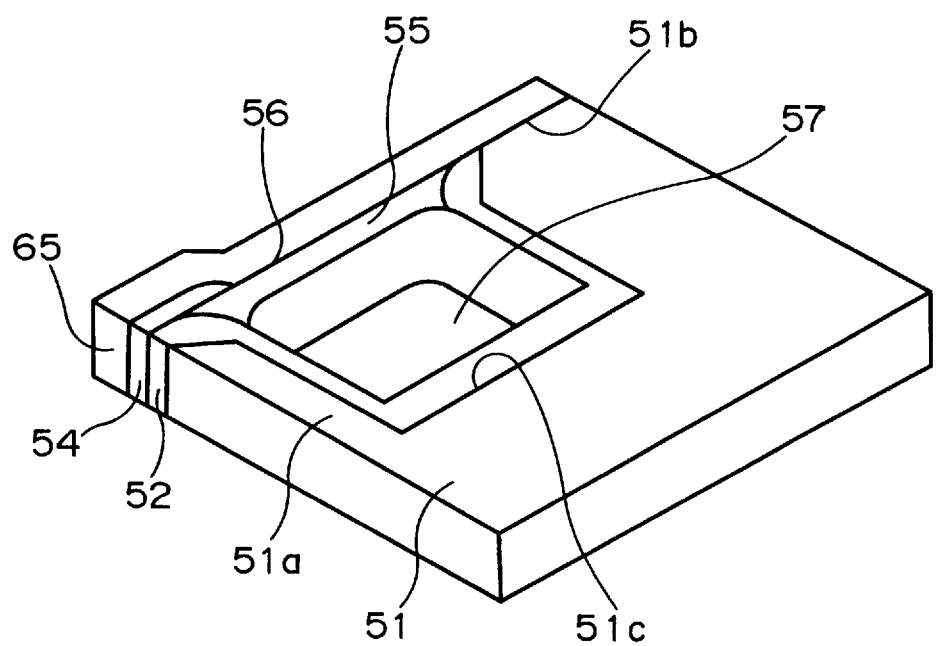
FIG. 10 is a perspective view illustrating a magnetic head in accordance with the third embodiment of the present invention.

FIG. 10 illustrates a magnetic head in accordance with the third embodiment of the present invention. The illustrated magnetic head includes a block 51 made of non-magnetic substance such as glass, and having first and second leg portions 51a and 51b defining a recess 51c therebetween. The first and second leg portions 51a and 51b are chamfered at inner edges thereof. A first magnetic thin film 52 is formed by vacuum thin film formation such as sputtering, covering an inner surface of the recess 51c. The first magnetic thin film 52 is made of FeTaN alloy, and has a thickness in the range of 1 $\mu$m to 10 $\mu$m both inclusive.

A member 55 connects the first and second leg portions 51a and 51b with each other between their inner edges therethrough. The member 55 is made of non-magnetic substance such as glass having a low melting point in the range of 300° C. to 500° C. The member 55 is formed therein with a window 57 for passing a wiring therethrough.

A non-magnetic thin film 54 is formed on the first magnetic thin film 52 above an end surface of the first leg portion 51a. The non-magnetic thin film 54 extends partially onto the glass member 55. The non-magnetic thin film 54 is made of $SiO_2$, and has a thickness equal to a magnetic gap length. The first magnetic thin film 52 and the member 55 cooperates with each other to thereby constitute a magnetic gap forming plane 56. A second magnetic thin film 65 made of FeTaN alloy is formed on the non-magnetic thin film 54 and the magnetic gap forming plane 56. Thus, the first magnetic thin film 52 and the second magnetic thin film 65 cooperate with each other to constitute substantially rectangular magnetic circuit.

FIGS. 11A to 11I illustrate respective steps of still a method of fabricating the magnetic head illustrated in FIG. 10.

Figure 11A:
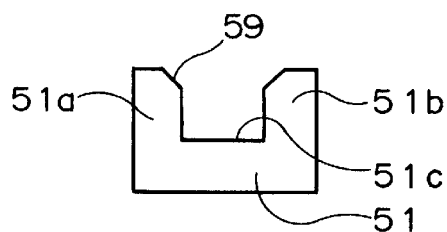
FIGS. 11A to 11I are cross-sectional views of the magnetic head illustrated in FIG. 10, showing respective steps of a method of fabricating the magnetic head.

First, as illustrated in FIG. 11A, there is prepared a block 51 made of glass, and having first and second leg portions 51a and 51b defining a recess 51c therebetween. The block 51 is chamfered with a grinding stone at end surfaces of the first and second leg portions 51a and 51b.

Figure 11B:
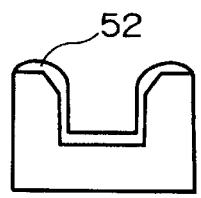

Then, as illustrated in FIG. 11B, a first magnetic thin film 52 is formed by sputtering on an inner surface of the recess 51c and end surfaces of the first and second leg portions 51a and 51b. The first magnetic thin film 52 is made of FeTaN alloy.

Figure 11C:
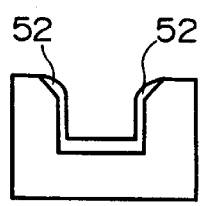

Then, the first magnetic thin film 52 is ground with a surface grinder until the end surfaces of the first and second leg portions 51a and 51b appear, as illustrated in FIG. 11C.

Figure 11D:
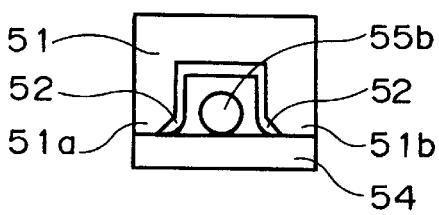

Then, as illustrated in FIG. 11D, the block 51 is turned upside down, and placed on a base 54 made of material having the same coefficient of thermal expansion of that of the block 51. The block 61 is temporarily fixed onto the base 54 by means of inorganic adhesive (not illustrated). Then, a glass rod 55b is inserted into the recess 51c on the base 54. The glass rod 55b has a volume by which there is formed a window 57 in the recess 51c when the glass rod 55b is molten and thus spread on the base 54 to thereby close the recess 51c.

Figure 11E:
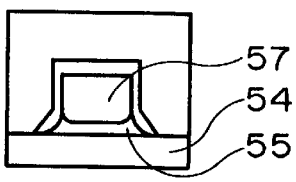

Then, as illustrated in FIG. 11E, the glass rod 55b is heated to thereby melt the glass rod 55b. The thus molten glass 55 spreads on the base 54. Then, the glass 5525 is cooled down to thereby connect the first and second leg portions 51a and 51b with each other therethrough.

Figure 11F:
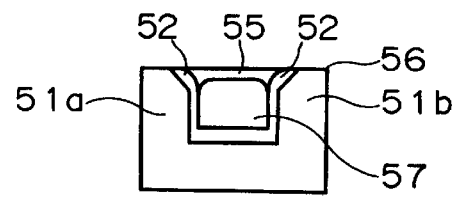

Then, as illustrated in FIG. 11F, the block 51 is turned upside up, and the base 54 is ground with a grinder until the glass 55 appears. Then, the glass 55 is mirror-polished to thereby constitute a magnetic gap forming plane 56.

Figure 11G:
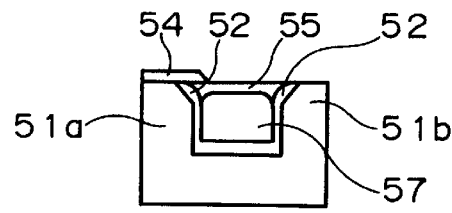

Then, as illustrated in FIG. 11G, a non-magnetic thin film 54 made of $SiO_2$ is formed on the magnetic gap forming plane 56 over the end surface of the first leg portion 51a, the first magnetic thin film 52, and a part of the glass 55.

Figure 11H:
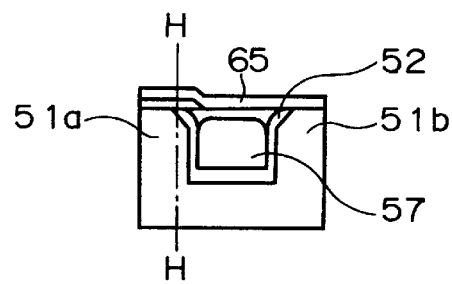
Figure 11I:
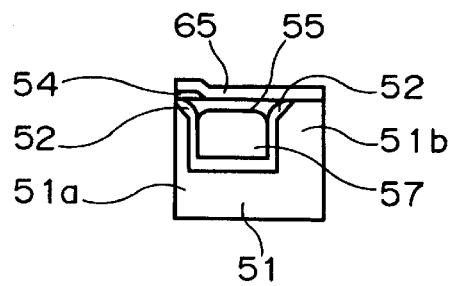

Then, as illustrated in FIG. 11H, a second magnetic thin film 65 made of FeTaN alloy is formed by sputtering over the magnetic gap forming plane 56 including the non-magnetic thin film 54. Then, the block 51 is ground with a surface grinder from a left side to a dashed line H—H, and the block 51 is sliced into pieces with a dicer in a direction perpendicular to a length-wise direction of the block 51. Each of the pieces of the block 51 has a predetermined track width. Thus, as illustrated in FIG. 11I, there is completed a magnetic head in accordance with the third embodiment illustrated in FIG. 10.

Figure 12:
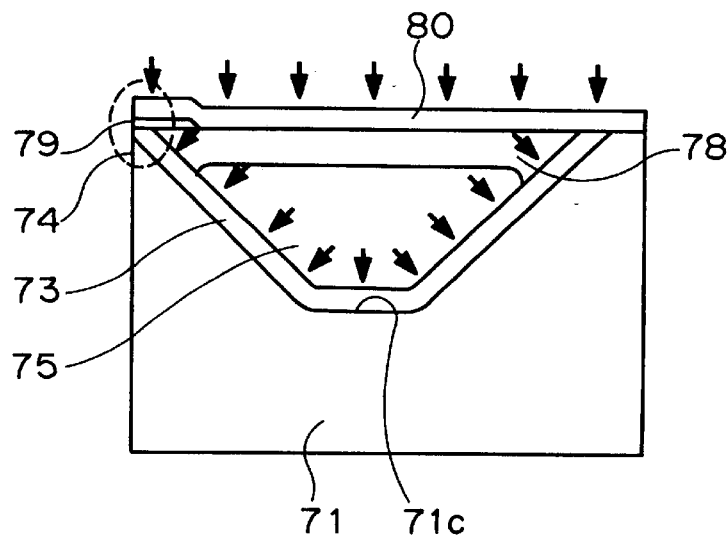
FIG. 12 is a cross-sectional view illustrating a magnetic head in accordance with the fourth embodiment of the present invention.

FIG. 12 illustrates a magnetic head in accordance with the fourth embodiment of the present invention. The illustrated magnetic head includes a block 71 made of non-magnetic material and formed with a V-shaped recess 71c, a first magnetic thin film 73 covering an inner surface of the V-shaped recess 71c, a member 78 made of non-magnetic material and bridging over the V-shaped recess 71c, a non-magnetic thin film 79 formed on an exposed surface of the first magnetic thin film 73 and extending partially onto the non-magnetic member 78, and a second magnetic thin film 80 formed over the member 78. Between the member 78 and the V-shaped recess 71c is formed a window 75 for a wiring passing therethrough.

Figure 13A:
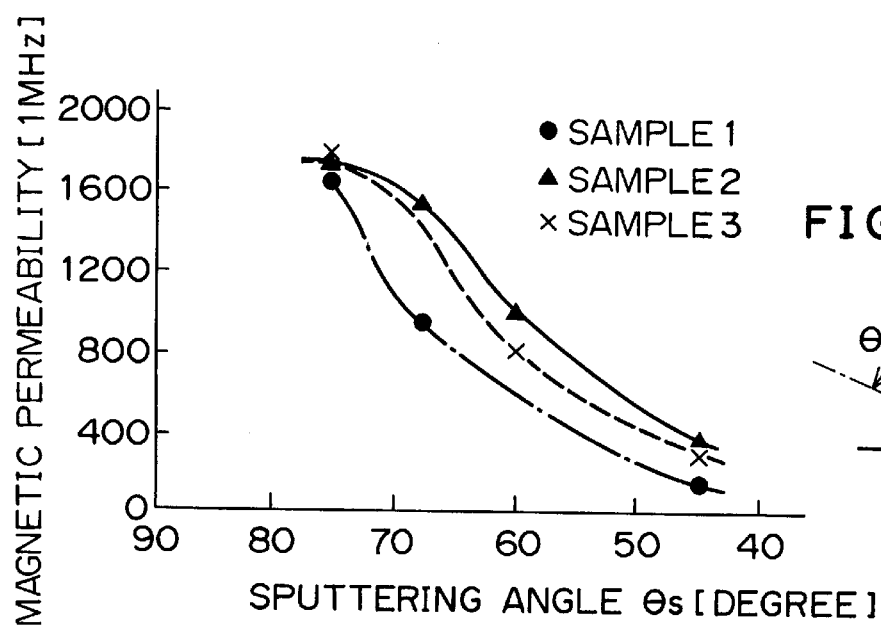
FIG. 13A is a graph showing a relation between a film formation angle and a magnetic permeability during sputtering.
Figure 13B:
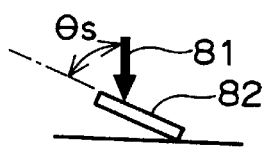
FIG. 13B is a schematic view illustrating a definition of the film formation angle.

The first and second magnetic thin films 73 and 80 are sputtered perpendicularly to a cross-section of a magnetic circuit, namely in a direction indicated with arrows so that the first and second magnetic thin films 73 and 80 could have the best magnetic characteristics as a magnetic head. Since magnetic thin films formed by sputtering have magnetic anisotropy, they have different magnetic characteristics in accordance with crystal orientations. The first and second magnetic thin films 73 and 80 in the fourth embodiment has a relation between a sputtering angle and a magnetic permeability of a magnetic thin film as illustrated in FIG. 13A. As illustrated in FIG. 13B, the sputtering angle θs is defined as an angle between a vertical line 81 and a formed film 82.

As is understood in FIG. 13A, as the sputtering angle θs is closer to 90° C., a magnetic permeability becomes greater. In general, a closed magnetic circuit such as a magnetic head has portions having different magnetic characteristics, and hence a magnetic characteristic of a magnetic head is usually represented as an average characteristic of the closed magnetic circuit. A characteristic in the vicinity of a magnetic gap 74 exerting the largest influence on the characteristic of a magnetic head has been conventionally optimized in order to utilize the magnetic anisotropy at its maximum. A characteristic in entirety of a magnetic circuit is quite important for a magnetic head including a non-magnetic block on which a magnetic thin film is formed, and hence it is necessary to optimize a magnetic characteristic all over a magnetic circuit. In FeTaN alloy alloy, a magnetic permeability is quite high in a direction substantially perpendicular to a sputtering direction. The magnetic head in accordance with the fourth embodiment has a magnetic thin film formed in such a direction.

FIGS. 14A to 14H illustrate respective steps of a method of fabricating a magnetic head illustrated in FIG. 12.

Figure 14A:
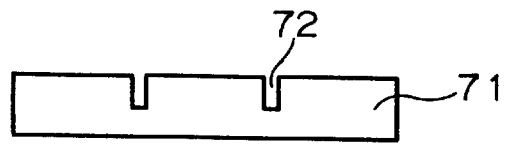
FIGS. 14A to 14H are cross-sectional views of the magnetic head illustrated in FIG. 12, showing respective steps of a method of fabricating the magnetic head.

First, as illustrated in FIG. 14A, there is prepared a wafer 71 made of a glass having a high melting point. Specifically, the glass 71 has a yield point at 500° C. and a softening point at 550° C. The glass wafer 71 is formed at an upper surface thereof with trenches 72 by means of a dicer which trenches have a width in the range of 0.1 mm to 0.3 mm and a depth of about 0.5 mm. The trenches 72 are spaced away from each other by about 1 mm. By cutting the glass wafer 71 at the trenches 72, a lot of the blocks 71 illustrated in FIG. 12 can be obtained. Then, the upper surface of the glass wafer 71 is mirror-polished, and washed.

Figure 14B:
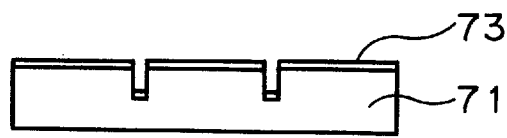

Then, as illustrated in FIG. 14B, a magnetic thin film 73 made of FeTaN alloy and having a thickness in the range of 4 to 6 micron is formed by sputtering on the upper surface of the glass wafer 71. The FeTaN alloy thin film 73 is arranged to have the anisotropy of a magnetic permeability so that the magnetic permeability is highest in a direction perpendicular to the trenches 72. A surface of a wafer formed with trenches by a dicer is generally rough when viewed in a microscopic way, and thus a film formed on the surface could not have appropriate characteristics unless the film has a sufficient thickness. However, the magnetic thin film 73 is sputtered on a mirror-polished surface in this method, the magnetic film 73 can have appropriate characteristics, even if it is thin.

Figure 14C:
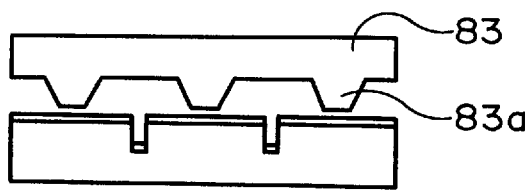

Then, as illustrated in FIG. 14C, there is prepared a mold block 83 made of ceramics and is formed with a plurality of raised portions 83a complementary to the window 75 in shape. The glass wafer 71 is in advance heated to thereby soften the glass wafer 71. Then, as illustrated in FIG. 14C, the mold block 83 is pressed onto the glass wafer 71 with the magnetic thin film 73 sandwiched therebetween. When the mold block 83 is being pressed onto the glass wafer 71, the glass wafer 71 may be heated at the same time.

The raised portions 83a of the mold block 83 have rounded corners, which ensures less alteration in magnetic characteristics of the magnetic thin film 73, and makes an effect obtained when the glass wafer 71 is annealed greater. In addition, the rounded corners ensure that the magnetic thin film 73 is not split or broken.

Figure 15:
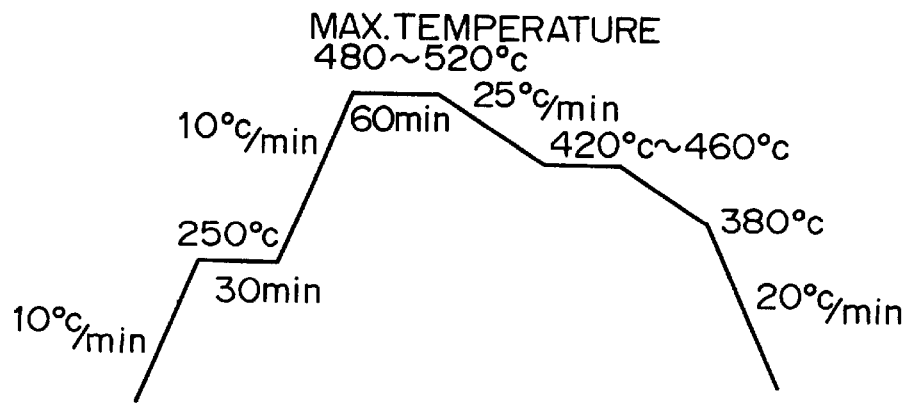
FIG. 15 illustrates a temperature profile in a furnace used for carrying out the method illustrated in FIGS. 14A to 14H.

FIG. 15 illustrates an example of temperature profiles for heating the glass wafer 71. A maximum temperature in the range of 480° C. to 520° C. is kept for about an hour in order that the window 75 can be readily formed. In addition, the magnetic thin film 73 could have improved characteristics by being heated or annealed. Then, the temperature is decreased to a range of 420° C. to 460° C., and a temperature in the vicinity of a transition point is kept for about 50 minutes to thereby eliminate deformation of the glass wafer 71. Then, the temperature is decreased again.

Figure 14D:

Thus, as illustrated in FIG. 14D, there are formed a plurality of the blocks 71 having the recesses 71c as illustrated in FIG. 12. Then, the mold block 83 is drawn out of the glass wafer 71. Then, a protection film (not illustrated) is formed by sputtering over the FeTaN alloy thin film 73. The protection film is composed of one or more of $Al_2O_3$, $SiO_2$, Cr, and Cu.

Figure 14E:
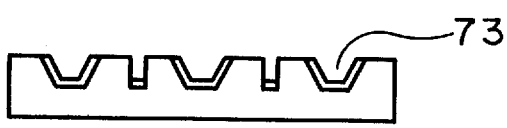

Then, as illustrated in FIG. 14E, the glass wafer 71 is ground with a surface grinder in order to flatten an upper surface of the glass wafer 71.

Figure 14F:
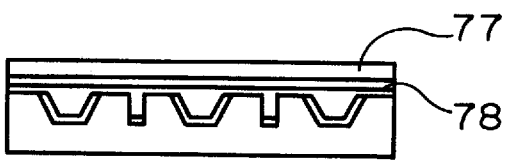

Then, as illustrated in FIG. 14F, a glass layer 78 formed on a substrate 77 is put on the glass wafer 71. The glass layer 78 is made of glass having a low melting point.

Figure 14G:
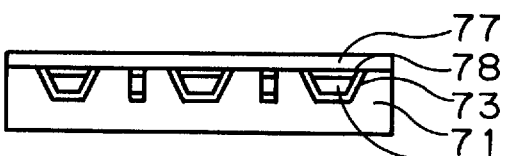

Then, as illustrated in FIG. 14G, the glass layer 78 is heated close to its melting point and put into half-molten condition. Then, the glass layer 78 together with the substrate 77 is pressed onto the glass wafer 71 until the glass layer 78 is bridged over the recesses 71c of the block 71. Namely, at this stage, the magnetic thin films 73 are connected at their opposite edges to each other through the glass layer 78 with the window 75 being formed between the magnetic thin film 73 and the glass layer 78.

Figure 14H:
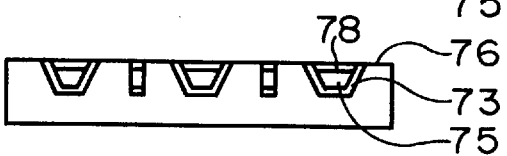

Then, as illustrated in FIG. 14H, the substrate 77 is ground for removal. An exposed surface of a resultant is mirror-polished to thereby constitute a magnetic gap forming plane 76.

Then, the glass wafer 71 is split at the trenches 72 to thereby separate into a plurality of the blocks 71 illustrated in FIG. 12. Thereafter, the steps having been described with reference to FIGS. 4E to 4G are carried out to thereby complete the magnetic head illustrated in FIG. 12 in accordance with the fourth embodiment.

Figure 16:
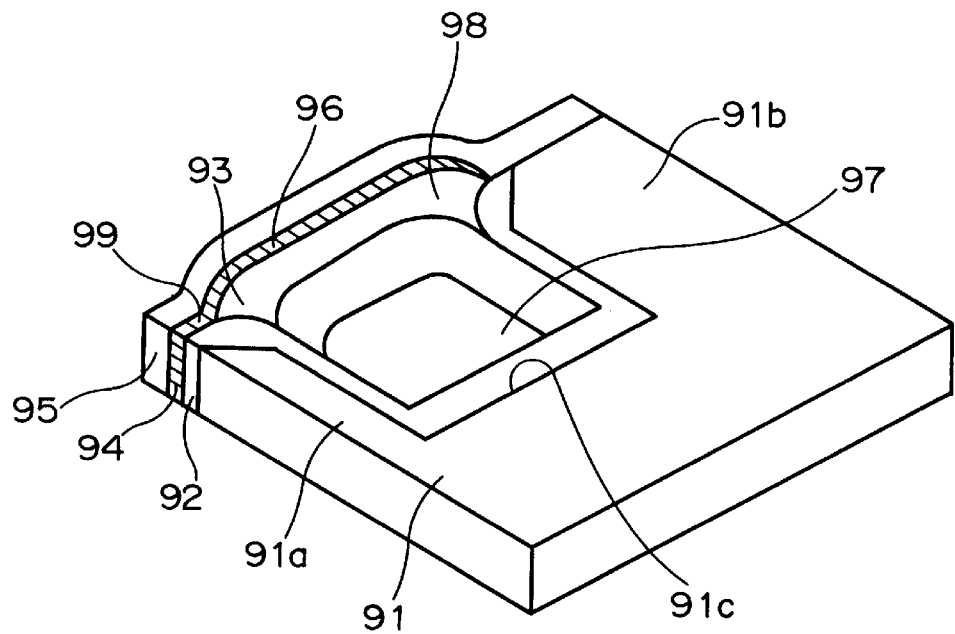
FIG. 16 is a perspective view illustrating a magnetic head in accordance with the fifth embodiment of the present invention.

FIG. 16 illustrates a magnetic head in accordance with the fifth embodiment of the present invention. The illustrated magnetic head is designed to have double apexes in order to enhance an efficiency of the magnetic head. Herein, an apex means a triangular section situated in the vicinity of the depth end.

The magnetic head includes a block 71 made of magnetic substance such as magnetic ferrite, and having first and second leg portions 91a and 91b defining a recess 91c therebetween. A first magnetic thin film 92 is formed by vacuum thin film formation such as sputtering, covering an inner surface of the recess 91c. The first magnetic thin film 92 is made of FeTaN alloy, and has a thickness in the range of 1 μm to 10 μm.

A member 98 made of non-magnetic substance connects the first and second leg portions 91a and 91b with each other therethrough at their inner edges. In this embodiment, the non-magnetic member 98 is made of a glass having a low melting point in the range of 300° C. to 500° C. The non-magnetic member 98 and the first magnetic thin film 92 cooperate with each other to thereby form a window 97 within the recess 91c. The non-magnetic member 98 is formed arcuate in shape, namely is designed to project outwardly of the window 97.

The first magnetic thin film 92 and the non-magnetic member 98 cooperate with each other to thereby constitute a magnetic gap forming plane 96, on which a non-magnetic thin film 94 is formed. Specifically, the non-magnetic thin film 94 is formed over an exposed portion of the first magnetic thin film 92 above the first leg portion 91a, and the non-magnetic member 98 connecting the first and second leg portions 91a and 91b with each other. The non-magnetic thin film 94 is made of $SiO_2$ and has a predetermined thickness, and constitutes a magnetic gap.

A second magnetic thin film 95 made of FeTaN alloy is formed over the non-magnetic thin film 94 and an end surface of the second leg portion 91b. Thus, the first and second magnetic thin films 92 and 95 cooperate with each other to thereby establish a magnetic circuit.

Since the second magnetic thin film 95 is formed on the non-magnetic member 98 projecting outwardly of the window 97 with the non-magnetic thin film 94 being sandwiched therebetween, an apex 93 extends towards opposite sides of a depth end 99 of the magnetic gap to thereby form double apexes. A magnetic head having a large gap depth is scarcely influenced by a shape of an apex. In contrast, a magnetic head having a small gap depth, such as HDD head, is greatly influenced by a shape of an apex with respect to data reproduction efficiency of the magnetic head. Namely, if an apex has a small apex angle, sensitivity in recording data and sensitivity in reproducing data are deteriorated.

Figure 17:
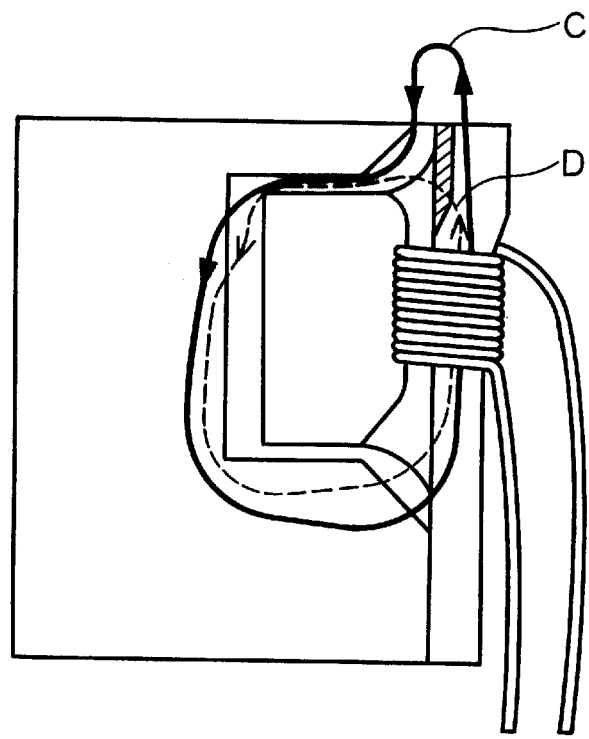
FIG. 17 illustrates a magnetic flux produced in recording data.
Figure 18:
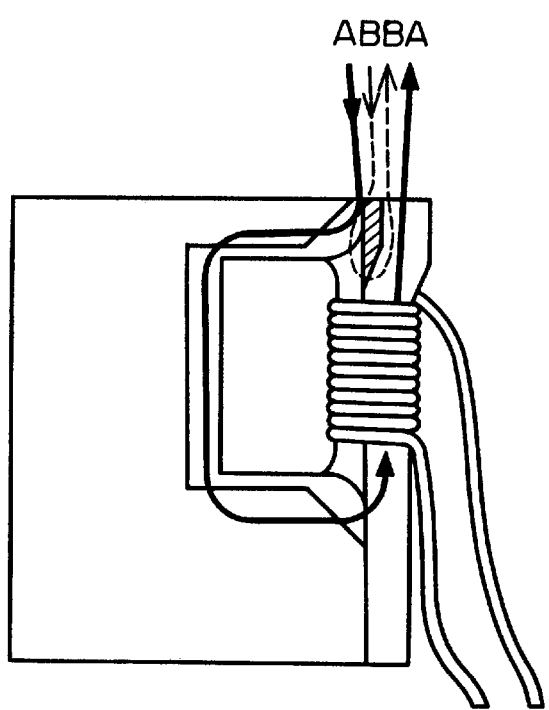
FIG. 18 illustrates a magnetic flux produced in reproducing data.

As illustrated in FIG. 17, a majority of magnetic flux generated in recording data makes a loop C indicated with a solid line, however, a minority of magnetic flux makes a loop D indicated with a broken line. The minority of magnetic flux increases inductance, but does not contribute to enhancement in recording characteristic. As illustrated in FIG. 18, a majority of magnetic flux generated in reproducing data makes a loop A indicated with solid lines, and contributes to output. However, a minority of magnetic flux makes a short loop B at an apex, as indicated with broken lines, which loop B does not pass a magnetic circuit established by a coil wounded around a magnetic head. Hence, the magnetic flux making the loop B does not contribute to output, and accordingly magnetic head efficiency is deteriorated. In a single apex magnetic head in which one of magnetic circuits is linear, an angle of an apex can be maximized to approximately 90 degrees. However, in practical use, an apex is designed to have an angle of about 45 degrees because it is necessary to avoid reduction of a strength and an apex of 45 degrees would be easier to form than an apex of 90 degrees.

FIGS. 19A to 19J illustrate respective steps of a method of fabricating a magnetic head illustrated in FIG. 16.

Figure 19A:
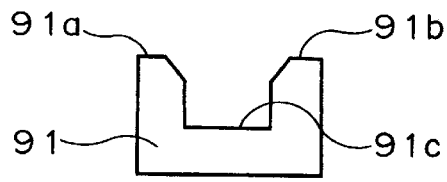
FIGS. 19A to 19J are cross-sectional views of the magnetic head illustrated in FIG. 16, showing respective steps of a method of fabricating the magnetic head.

First, as illustrated in FIG. 19A, there is prepared a block 91 made of magnetic substance such as magnetic ferrite, and having first and second leg portions 91a and 91b defining a recess 91c therebetween. The block 91 is chamfered with a grinding stone at inner edges of the first and second leg portions 91a and 91b.

Figure 19B:
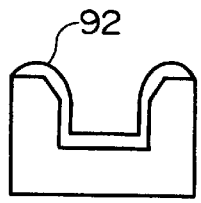

Then, as illustrated in FIG. 19B, a first magnetic thin film 92 is formed by sputtering on an inner surface of the recess 91c and end surfaces of the first and second leg portions 91a and 91b. The first magnetic thin film 92 is made of FeTaN alloy.

Figure 19C:
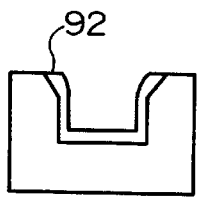

Then, as illustrated in FIG. 19C, the first magnetic thin film 92 is ground with a surface grinder until the end surfaces of the first and second leg portions 91a and 91b appear.

Figure 19D:
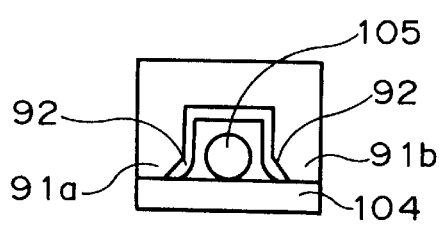

Then, as illustrated in FIG. 19D, the block 91 is turned upside down, and placed on a base 104 made of material having the same coefficient of thermal expansion of that of the block 91. The block 91 is temporarily fixed onto the base 104 by means of inorganic adhesive (not illustrated). Then, a rod 105 made of glass having a low melting point is inserted into the recess 91c on the base 104. The glass rod 105 has a volume by which there is formed a window 97 in the recess 91c when the glass rod 105 is molten and thus spread on the base 104 to thereby close the recess 91c.

Figure 19E:
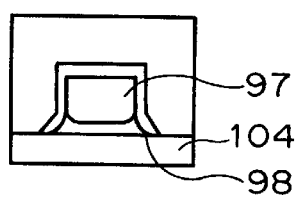

Then, as illustrated in FIG. 19E, the glass rod 105 is heated to thereby melt the glass rod 105. The thus molten glass 105 spreads on the base 104. Then, the glass 105 is cooled down to thereby form a member 98 connecting the first and second leg portions 91a and 91b with each other therethrough.

Figure 19F:
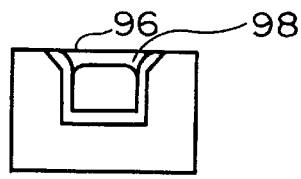

Then, as illustrated in FIG. 19F, the block 91 is turned upside up, and the base 104 is ground with a grinder until the glass 105 appears. Then, the glass 105 is mirror-polished to thereby constitute a magnetic gap forming plane 96.

Figure 19G:
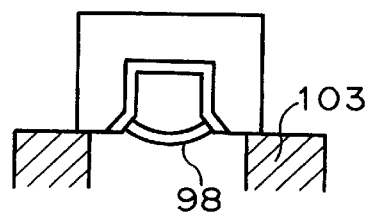

Then, as illustrated in FIG. 19G, the block 91 is turned upside down again, and placed on a block 103 so that the recess 91c is open downwardly. In this condition, the magnetic gap forming plane 96 faces downwardly. Then, the block 91 and hence the plane 96 is heated for 30 minutes to 1 hour under conditions such that the glass of which the member 98 is made is kept to have a viscosity slightly higher than a viscosity at a yield point, specifically a viscosity in the range of $1 \times 10^{10}$ to $1 \times 10^{11}$ poise. As a result, the non-magnetic member 98 is given a certain curvature directing downwardly. In this step illustrated in FIG. 19G, attention should be paid to that the non-magnetic member 98 constituting an arcuate glass does not make contact with any other parts, in particular, the block 103.

Figure 19H:
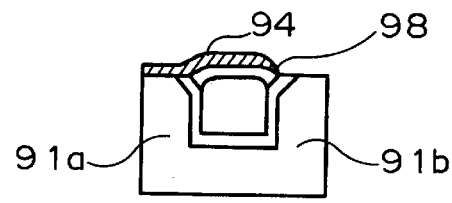

Then, as illustrated in FIG. 19H, a non-magnetic thin film 94 made of $SiO_2$ is formed on the magnetic gap forming plane 96 over the end surface of the first leg portion 91a, the first magnetic thin film 92, and the non-magnetic member 98.

Figure 19I:
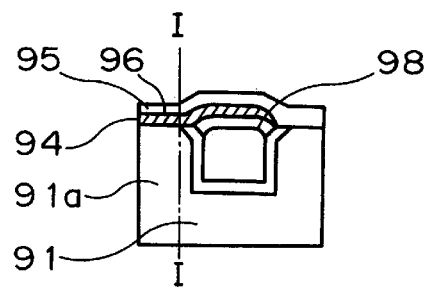
Figure 19J:
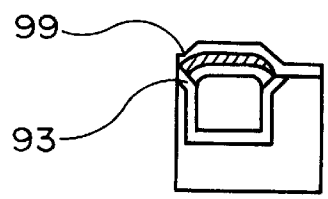

Then, as illustrated in FIG. 19I, a second magnetic thin film 95 made of FeTaN alloy is formed by sputtering over the magnetic gap forming plane 16 including the non-magnetic thin film 94. Then, the block 91 is ground with a surface grinder from a left side to a dashed line I—I, and the block 91 is sliced into pieces with a dicer in a direction perpendicular to a length-wise direction of the block 21. Each of the pieces of the block 21 has a predetermined track width. Thus, as illustrated in FIG. 19J, there is completed a magnetic head in accordance with the fifth embodiment.

The non-magnetic member 98 connecting the first and second leg portions 91a and 91b to each other is formed smoothly arcuate without any inflection points. Hence, the second magnetic thin film 95 is also smoothly arcuate following the underlying arcuate member 98, ensuring less deterioration in magnetic performances of the second magnetic thin film 95.

The apex 93 is designed to extend towards opposite sides of the depth end 99. This is an ideal double apex shape. In the fourth embodiment, the magnetic head has maximum magnetic characteristics when the apex 93 extends towards the opposite sides of the depth end 99 by an angle ranging from 45 degrees to 50 degrees both inclusive, namely when an apex angle is in the range of 90 degrees to 100 degrees both inclusive.

In the above mentioned method, the non-magnetic member 98 is deformed into an arcuate shape by heating after the block 91 is mirror-polished for forming the magnetic gap forming plane 96. The arcuate member 98 may be formed by etching or milling the member 98, the first magnetic thin film 92 and the first leg portion 91a so that the magnetic gap forming plane 96 projects outwardly of the window 97.

Figure 20:
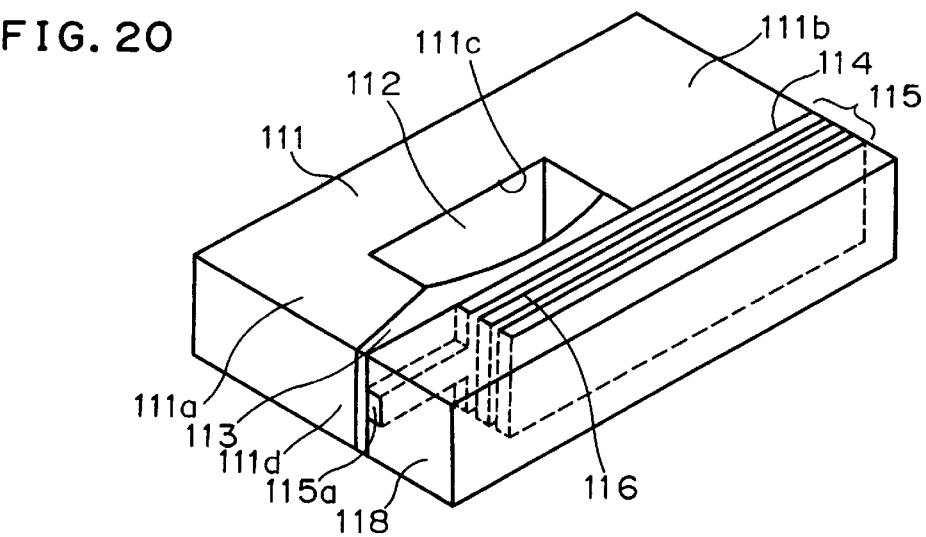
FIG. 20 is a perspective view illustrating a magnetic head in accordance with the sixth embodiment of the present invention.

FIG. 20 illustrates a magnetic head in accordance with the sixth embodiment of the present invention. In this embodiment, the invention is applied to a vertical magnetic head. The illustrated magnetic head includes a block 111 made of magnetic substance such as magnetic ferrite, and having first and second leg portions 111a and 111b defining a recess 111c therebetween. A member 113 made of non-magnetic substance such as a glass having a melting point in the range of 300° C. to 600° C. both inclusive connects the first and second leg portions 111a and 111b with each other therethrough. The first and second leg portions 111a and 111b and the member 113 define a window 112 therebetween through which a wiring is introduced.

An end surface of the second leg portion 111b and the non-magnetic member 113 cooperates with each other to thereby form a vertical magnetic core forming plane 114, which is mirror-polished. A magnetic thin film 115 made of FeTaN alloy is formed on the vertical magnetic core forming plane 114 by vacuum thin film formation process such as sputtering.

A main magnetic pole 115a having a certain width and a thickness in the range of 0.01 $\mu$m to 0.3 $\mu$m is formed above the first leg portion 111a. The main magnetic pole 115a is exposed outside on a surface 111d at which the vertical magnetic head faces a recording medium. For instance, the main magnetic pole 115a is formed by masking in sputtering the magnetic thin film 115, or by milling after sputtering the magnetic thin film 115. A spacing between the main magnetic pole 115a and a return path core is dependent on material of which the main magnetic pole 115a is made or a shape of the main magnetic pole 115a, but is designed to be in the range of 0.2 $\mu$m to 10 $\mu$m in the instant embodiment. An I-shaped core 116 having a low magnetic resistance is formed in connection with the main magnetic pole 115a. The main magnetic pole 115a and the magnetic thin film 115 are covered with an insulating protection layer 118.

In the above mentioned vertical magnetic head, the first and second leg portions 111a and 111b are connected with each other through the non-magnetic member 113 over the recess 111c of the magnetic block 111 constituting a return path core of the vertical magnetic head. The main magnetic pole 115a is formed by sputtering on the non-magnetic member 113. Thus, the vertical magnetic head can be fabricated without any welding steps and also without steps of raising a temperature after a magnetic thin film has been formed, which ensures no deterioration of magnetic characteristics of the magnetic thin films.

Figure 21:
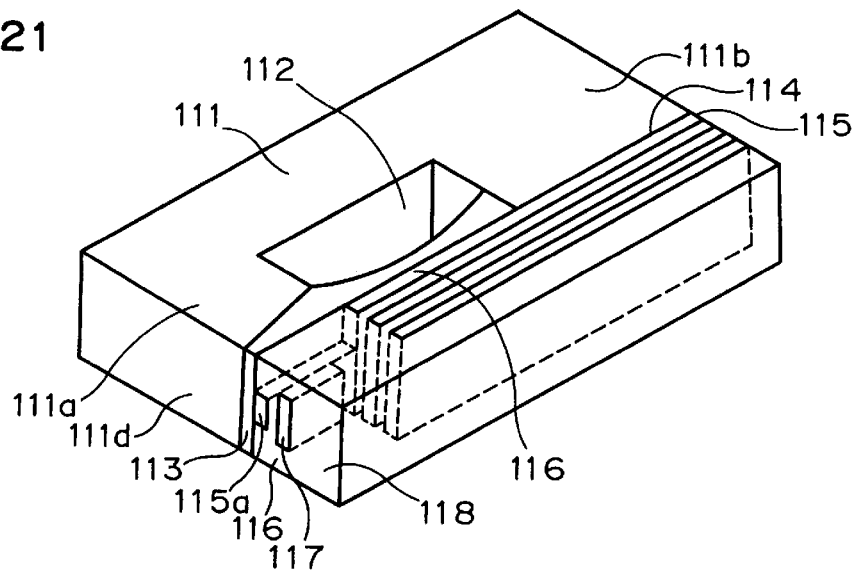
FIG. 21 is a perspective view illustrating a magnetic head in accordance with the seventh embodiment of the present invention.

FIG. 21 illustrates a magnetic head in accordance with the seventh embodiment of the present invention. In the embodiment, the invention is applied to a compound magnetic head including a vertical magnetic head and a magneto-resistance effect type magnetic head. The vertical magnetic head partially constituting the illustrated compound magnetic head is the same as one illustrated in FIG. 20.

There is formed an alumina film (not illustrated) on upper surfaces of the main magnetic pole 115a and the I-shaped core 116 connecting to the main magnetic pole 115a. A magneto-resistance effect device 117 is disposed in parallel with the main magnetic pole 115a and in the vicinity of the surface 111d. The magneto-resistance effect device 117 is insulated from the vertical magnetic head by the alumina film. A lead (not illustrated) is formed in electrical connection with the magneto-resistance effect device 117. The main magnetic pole 115a, the magnetic thin film 115 and the magneto-resistance effect device 117 are covered with the insulating protection film 118. Thus, the magneto-resistance effect magnetic head is formed on the vertical magnetic head with an insulating film sandwiched therebetween.

The magneto-resistance effect device 117 formed on the main magnetic pole 115a with the alumina film sandwiched therebetween has a surface roughness which has been kept unchanged, because only the main magnetic pole 115a and the alumina film are formed on the mirror-polished, vertical magnetic core forming plane 114. Thus, it is ensured that the magneto-resistance effect device 117 can have a surface roughness equal to or smaller than 50 angstroms which is generally required for the formation of a magneto-resistance effect device.

Figure 22:
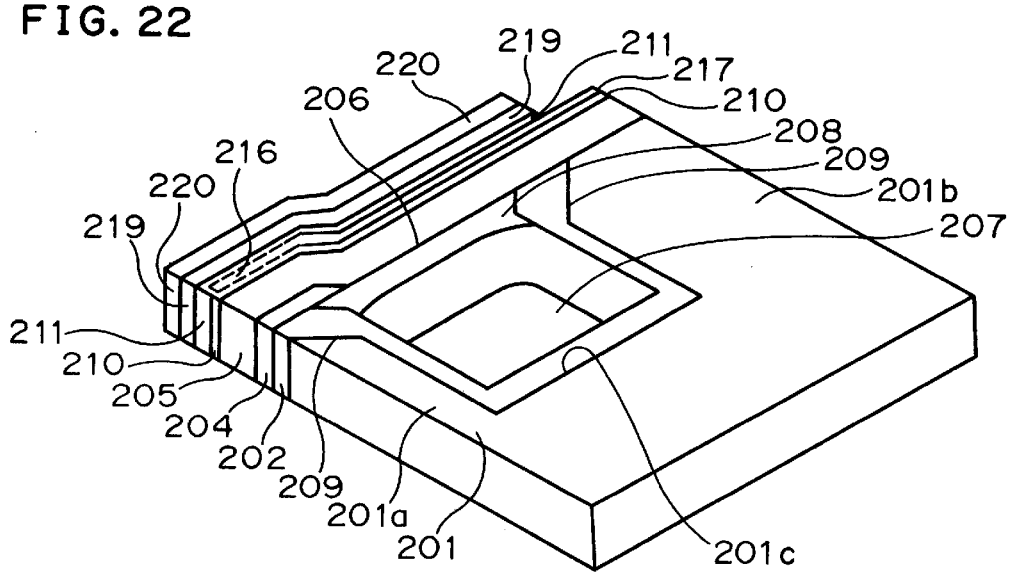
FIG. 22 is a perspective view illustrating a magnetic head in accordance with the eighth embodiment of the present invention.

FIG. 22 illustrates a magnetic head in accordance with the eighth embodiment of the present invention. In the embodiment, the invention is applied to a compound magnetic head including a first magnetic head for recording data and a second magnetic head for reproducing data.

The first magnetic head includes a block 201 made of magnetic substance such as magnetic ferrite, and having first and second leg portions 201a and 201b defining a recess 201c therebetween, a first magnetic thin film 202 covering an inner surface of the recess 201c therewith, a member 208 made of non-magnetic substance, and connecting the first and second leg portions 201a and 201b with each other therethrough, a non-magnetic thin film 204 formed on the first magnetic thin film 202 above an end surface of the first leg portion 201a, and a second magnetic thin film 205 formed on the non-magnetic thin film 204, the member 208, an end surface of the first magnetic thin film 202, and an end surface of the second leg portion 201b.

The first magnetic thin film 202 is made of FeTaN alloy, and is formed by vacuum thin film formation such as sputtering to have a thickness in the range of 1 µm to 10 µm. In the instant embodiment, the member 208 is made of a glass having a low melting point, specifically, a glass having a melting point in the range of 300° C. to 550° C. The first magnetic thin film 202 and the non-magnetic member 208 cooperate with each other to form a window 207 through which a wiring is introduced for forming a coil.

The first magnetic thin film 202 and the non-magnetic member 208 cooperate with each other to thereby form a magnetic gap forming plane 206, on which the non-magnetic thin film 204 is formed. The non-magnetic thin film 204 is made of $SiO_2$ in a predetermined thickness, and constitutes a magnetic gap.

The second magnetic thin film 205 is made of FeTaN, and cooperates with the first magnetic thin film 202 to establish a magnetic circuit for the magnetic head. A coil is wound around the block 201 through the window 207 to thereby complete an inductive head.

On the other hand, the second magnetic head includes a first non-magnetic insulating thin film 210 made of $SiO_2$ and formed on the second magnetic thin film 205, a magneto-resistance (MR) effect device 216 formed on the first non-magnetic insulating film 210 above the first leg portion 201a, a lead 217 making electrical connection with the MR effect device 216 and extending to above the second leg portion 201b, a second non-magnetic insulating thin film 211 made of $SiO_2$, covering the MR effect device and the lead therewith, a third magnetic thin film 219 made of FeTaN formed on the second non-magnetic insulating thin film 211, and a protection layer 220 formed on the third magnetic thin film 219.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Applications Nos. 7-159018, 7-191717, 7-215643, 7-251080, 7-281529 and 8-138039 filed on Jun. 26, 1995, Jul. 27, 1995, Aug. 24, 1995, Sep. 28, 1995, Aug. 30, 1995 and May 31, 1996, respectively, each including specification, claims, drawings and summary is incorporated herein by reference in its entirety.

What is claimed is:

1. A compound magnetic head including a first magnetic head for recording data and a second magnetic head for reproducing data, said first magnetic head comprising:

(a) a unitary block made of magnetic substance, and having first and second leg portions, chamfered at their inner edges, and defining a recess therebetween;

(b) a first magnetic thin film covering (i) at least an upper surface of said first leg portion and (ii) said chamfered edges of said first and second leg portions;

(c) a non-magnetic member formed within said recess so as to connect said first and second leg portions with each other through said first magnetic thin film, said non-magnetic member being formed in situ from a molten mass thereof with an opening through which a wiring is introduced, (d) a non-magnetic thin film formed on said first magnetic thin film above said upper surface of said first leg portion, said non-magnetic thin film constituting a magnetic gap; and (e) a second magnetic thin film formed on said non-magnetic thin film, said member and an upper surface of said second leg portion, said second magnetic head comprising:

(a) a first non-magnetic insulating thin film formed on said second magnetic thin film;

(b) a magneto-resistance effect device formed on said first non-magnetic insulating film above said first leg portion;

(c) a lead making electrical connection with said magneto-resistance effect device;

(d) a second non-magnetic insulating thin film covering said magneto-resistance effect device and said lead therewith; and (e) a third magnetic thin film formed on said second non-magnetic insulating thin film.

2. The compound magnetic head as set forth in claim 1, wherein said second magnetic head further comprising a protection layer formed on said third magnetic thin film for protecting the same.

3. The compound magnetic head as set forth in claim 1, wherein at least one of said first, second and third magnetic thin films is made of FeTaN alloy.

4. The compound magnetic head as set forth in claim 1, wherein said first magnetic thin film has a thickness in the range of 1 µm to 10 µm.

5. The compound magnetic head according to claim 1, wherein said non-magnetic member comprises glass.

6. A compound magnetic head according to claim 5, wherein said glass has a melting point in the range of 300° C. to 550° C.

7. A compound magnetic head according to claim 1, wherein said non-metallic thin film is made of $SiO_2$.

\* \* \* \* \*